(12) United States Patent
Chuang et al.

(10) Patent No.: US 11,743,009 B2
(45) Date of Patent: *Aug. 29, 2023

(54) REFERENCE SIGNAL DESIGN FOR NR DOWNLINK POSITIONING: SUPPLEMENTARY RS DESIGN

(71) Applicant: Mediatek Inc., Hsin-Chu (TW)

(72) Inventors: Chiao Yao Chuang, Hsin-Chu (TW); Xuan-Chao Huang, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/687,776

(22) Filed: Mar. 7, 2022

(65) Prior Publication Data

US 2022/0224477 A1 Jul. 14, 2022

Related U.S. Application Data

(63) Continuation of application No. 16/536,639, filed on Aug. 9, 2019, now Pat. No. 11,290,229.

(60) Provisional application No. 62/840,470, filed on Apr. 30, 2019, provisional application No. 62/827,244, filed on Apr. 1, 2019, provisional application No. 62/814,915, filed on Mar. 7, 2019, provisional application No. 62/804,878, filed on Feb. 13, 2019,
(Continued)

(51) Int. Cl.
*H04L 5/00* (2006.01)
*H04W 72/044* (2023.01)
*H04W 72/23* (2023.01)

(52) U.S. Cl.
CPC ......... *H04L 5/0048* (2013.01); *H04W 72/044* (2013.01); *H04W 72/23* (2023.01)

(58) Field of Classification Search
CPC .. H04L 5/0048; H04L 5/0094; H04W 72/042; H04W 72/044
See application file for complete search history.

(56) References Cited

U.S. PATENT DOCUMENTS

| 9,482,742 B1* | 11/2016 | Fischer | G01S 5/0236 |
| 2012/0093101 A1* | 4/2012 | Dai | H04L 5/0048 |
| | | | 370/329 |

(Continued)

FOREIGN PATENT DOCUMENTS

| CN | 101616360 A | 12/2009 |
| CN | 102647790 A | 8/2012 |

(Continued)

OTHER PUBLICATIONS

Chinese Patent Office, "Office Action", dated Feb. 24, 2022, China.
Chinese Search Report, dated Jan. 27, 2022, China.

*Primary Examiner* — Shailendra Kumar
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be a UE. The apparatus may be a UE. The apparatus may be a UE. The UE receives one or more positioning reference signal parameters from a base station. The UE determines resource elements in a transmission bandwidth carrying multiple positioning reference signals based on the positioning reference signal parameters. The UE decodes symbols in the resource elements.

17 Claims, 19 Drawing Sheets

Related U.S. Application Data provisional application No. 62/754,677, filed on Nov. 2, 2018, provisional application No. 62/754,674, filed on Nov. 2, 2018, provisional application No. 62/754,690, filed on Nov. 2, 2018, provisional application No. 62/754,670, filed on Nov. 2, 2018, provisional application No. 62/740,459, filed on Oct. 3, 2018, provisional application No. 62/726,472, filed on Sep. 4, 2018, provisional application No. 62/726,480, filed on Sep. 4, 2018, provisional application No. 62/717,127, filed on Aug. 10, 2018.

(56) References Cited

U.S. PATENT DOCUMENTS

| | | | | |
|---|---|---|---|---|
| 2019/0215121 | A1* | 7/2019 | Lin | H04L 5/0007 |
| 2019/0373450 | A1* | 12/2019 | Zhou | H04W 48/12 |

FOREIGN PATENT DOCUMENTS

| | | | |
|---|---|---|---|
| CN | 107889212 | A | 4/2018 |
| EP | 2439965 | A1 | 4/2012 |
| WO | 2018128975 | A1 | 7/2018 |

* cited by examiner

Type 2 + Type B

REFERENCE SIGNAL DESIGN FOR NR DOWNLINK POSITIONING: SUPPLEMENTARY RS DESIGN

CROSS-REFERENCE TO RELATED APPLICATION(S)

This application is a continuation of U.S. patent application Ser. No. 16/536,639, entitled "REFERENCE SIGNAL DESIGN FOR NR DOWNLINK POSITIONING: SUPPLEMENTARY RS DESIGN" and filed on Aug. 9, 2019, which claims the benefits of U.S. Provisional Application Ser. No. 62/717,127, entitled "INVENTION ON REFERENCE SIGNAL DESIGN FOR NR DOWNLINK POSITIONING" and filed on Aug. 10, 2018; U.S. Provisional Application Ser. No. 62/726,472, entitled "INVENTION ON POSITIONING REFERENCE SIGNAL DESIGN FOR NR DOWNLINK: COMB-2, COMB-3 DESIGN" and filed on Sep. 4, 2018; U.S. Provisional Application Ser. No. 62/726,480, entitled "INVENTION ON POSITIONING REFERENCE SIGNAL DESIGN FOR NR DOWNLINK: COMB-5,COMB-8" and filed on Sep. 4, 2018; U.S. Provisional Application Ser. No. 62/740,459, entitled "DESIGN OF INTERFERENCE AVOIDANCE FOR THE TRANSMISSION OF REFERENCE SIGNAL FOR POSITIONING" and filed on Oct. 3, 2018; U.S. Provisional Application Ser. No. 62/754,670, entitled "INVENTION ON REFERENCE SIGNAL BLOCK DESIGN FOR NR DOWNLINK POSITIONING: OBSERVABLE RANGE EQUAL TO THAT BY COMB-2 STRUCTURE" and filed on Nov. 2, 2018; U.S. Provisional Application Ser. No. 62/754,674, entitled "INVENTION ON REFERENCE SIGNAL BLOCK DESIGN FOR NR DOWNLINK POSITIONING: OBSERVABLE RANGE EQUAL TO THAT BY COMB-3 STRUCTURE" and filed on Nov. 2, 2018; U.S. Provisional Application Ser. No. 62/754,677, entitled "INVENTION ON REFERENCE SIGNAL BLOCK DESIGN FOR NR DOWNLINK POSITIONING: OBSERVABLE RANGE EQUAL TO THAT BY COMB-4 STRUCTURE" and filed on Nov. 2, 2018; U.S. Provisional Application Ser. No. 62/754,690, entitled "INVENTION ON REFERENCE SIGNAL BLOCK DESIGN FOR NR DOWNLINK POSITIONING: ANTENNA PORT AND BEAM SWEEPING ASPECT" and filed on Nov. 2, 2018; U.S. Provisional Application Ser. No. 62/804,878, entitled "INVENTION ON REFERENCE SIGNAL BLOCK DESIGN FOR NR DOWNLINK POSITIONING" and filed on Feb. 13, 2019; U.S. Provisional Application Ser. No. 62/814,915, filed on Mar. 7, 2019; U.S. Provisional Application Ser. No. 62/827,244, entitled "INVENTION ON REFERENCE SIGNAL DESIGN FOR NR DOWNLINK POSITIONING: SUPPLEMENTARY RS DESIGN" and filed on Apr. 1, 2019; and U.S. Provisional Application Ser. No. 62/840,470, entitled "INVENTION ON REFERENCE SIGNAL DESIGN FOR NR DOWNLINK POSITIONING: SUPPLEMENTARY RS DESIGN" and filed on Apr. 30, 2019; all of which are expressly incorporated by reference herein in their entirety.

BACKGROUND

Field

The present disclosure relates generally to communication systems, and more particularly, to techniques of transmitting multiple multi-slot uplink control channels by a user equipment (UE).

Background

The statements in this section merely provide background information related to the present disclosure and may not constitute prior art.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a UE. The apparatus may be a UE. The UE receives one or more positioning reference signal parameters from a base station. The UE determines resource elements in a transmission bandwidth carrying multiple positioning reference signals based on the positioning reference signal parameters. The UE decodes symbols in the resource elements.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
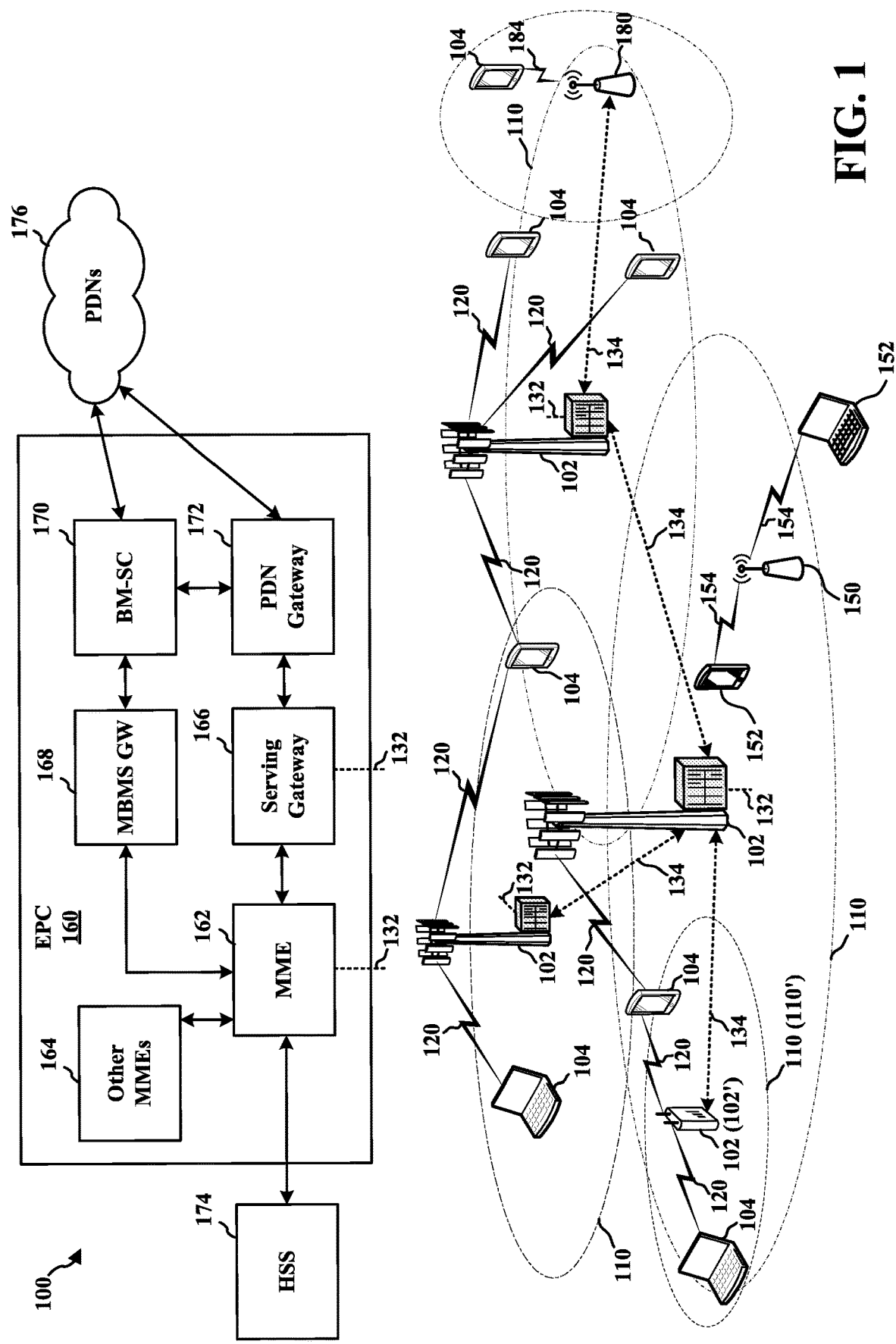
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and a core network 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the core network 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the core network 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The core network 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the core network 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the core network 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
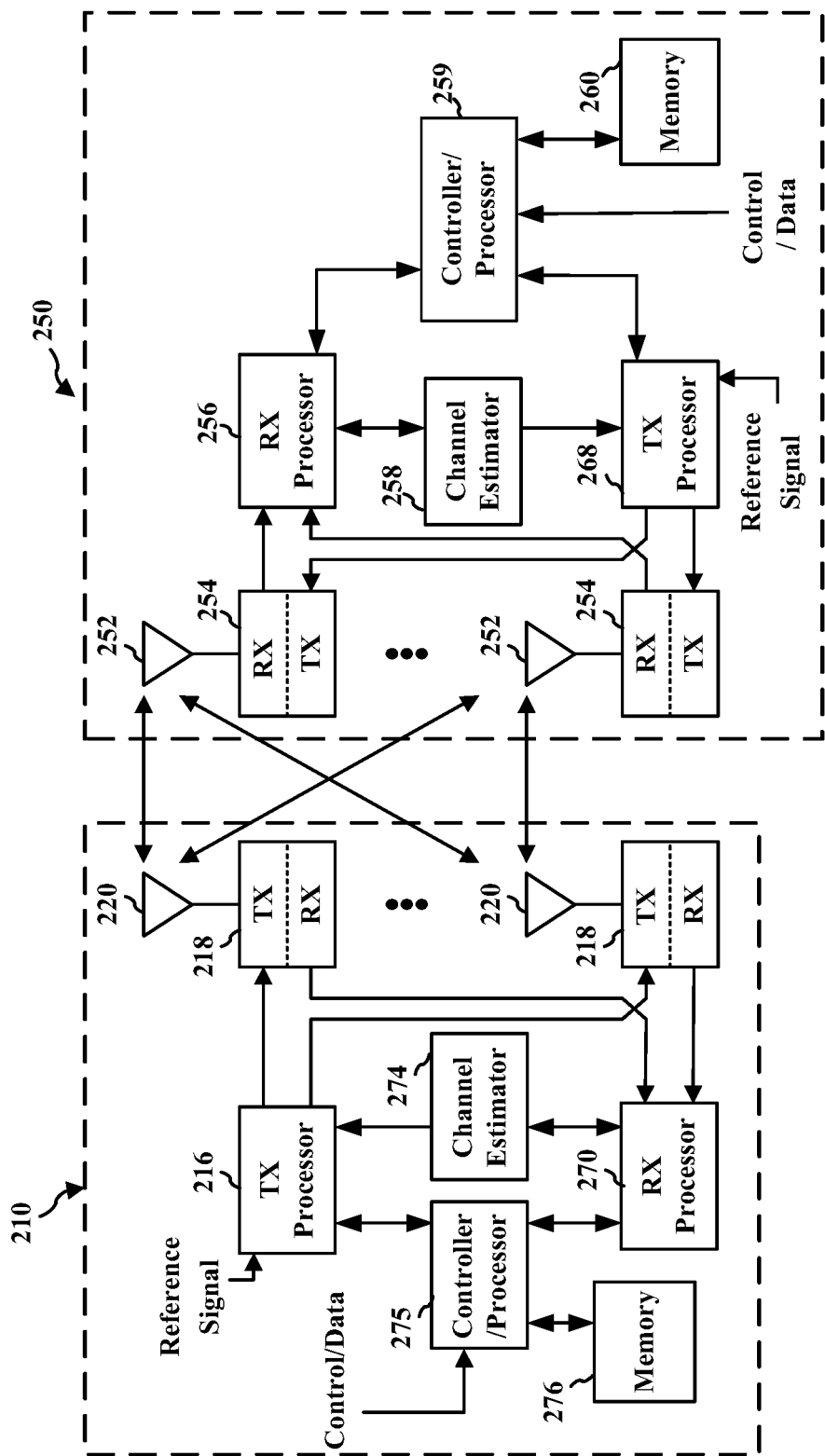
FIG. 2 is a diagram illustrating a base station in communication with a UE in an access network.

FIG. 2 is a block diagram of a base station 210 in communication with a UE 250 in an access network. In the DL, IP packets from the core network 160 may be provided to a controller/processor 275. The controller/processor 275 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 275 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 216 and the receive (RX) processor 270 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 216 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 274 may be used to determine the coding and modulation scheme, as well as for spatial processing. The channel estimate may be derived from a reference signal and/or channel condition feedback transmitted by the UE 250. Each spatial stream may then be provided to a different antenna 220 via a separate transmitter 218TX. Each transmitter 218TX may modulate an RF carrier with a respective spatial stream for transmission.

At the UE 250, each receiver 254RX receives a signal through its respective antenna 252. Each receiver 254RX recovers information modulated onto an RF carrier and provides the information to the receive (RX) processor 256. The TX processor 268 and the RX processor 256 implement layer 1 functionality associated with various signal processing functions. The RX processor 256 may perform spatial processing on the information to recover any spatial streams destined for the UE 250. If multiple spatial streams are destined for the UE 250, they may be combined by the RX processor 256 into a single OFDM symbol stream. The RX processor 256 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 210. These soft decisions may be based on channel estimates computed by the channel estimator 258. The soft decisions are then decoded and deinterleaved to recover the data and control signals that were originally transmitted by the base station 210 on the physical channel. The data and control signals are then provided to the controller/processor 259, which implements layer 3 and layer 2 functionality.

The controller/processor 259 can be associated with a memory 260 that stores program codes and data. The memory 260 may be referred to as a computer-readable medium. In the UL, the controller/processor 259 provides demultiplexing between transport and logical channels, packet reassembly, deciphering, header decompression, and control signal processing to recover IP packets from the core network 160. The controller/processor 259 is also responsible for error detection using an ACK and/or NACK protocol to support HARQ operations.

Similar to the functionality described in connection with the DL transmission by the base station 210, the controller/processor 259 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 258 from a reference signal or feedback transmitted by the base station 210 may be used by the TX processor 268 to select the appropriate coding and modulation schemes, and to facilitate spatial processing. The spatial streams generated by the TX processor 268 may be provided to different antenna 252 via separate transmitters 254TX. Each transmitter 254TX may modulate an RF carrier with a respective spatial stream for transmission. The UL transmission is processed at the base station 210 in a manner similar to that described in connection with the receiver function at the UE 250. Each receiver 218RX receives a signal through its respective antenna 220. Each receiver 218RX recovers information modulated onto an RF carrier and provides the information to a RX processor 270.

The controller/processor 275 can be associated with a memory 276 that stores program codes and data. The memory 276 may be referred to as a computer-readable medium. In the UL, the controller/processor 275 provides demultiplexing between transport and logical channels, packet reassembly, deciphering, header decompression, control signal processing to recover IP packets from the UE 250. IP packets from the controller/processor 275 may be provided to the core network 160. The controller/processor 275 is also responsible for error detection using an ACK and/or NACK protocol to support HARQ operations.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). NR may utilize OFDM with a cyclic prefix (CP) on the uplink and downlink and may include support for half-duplex operation using time division duplexing (TDD). NR may include Enhanced Mobile Broadband (eMBB) service targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra-reliable low latency communications (URLLC) service.

A single component carrier bandwidth of 100 MHZ may be supported. In one example, NR resource blocks (RBs) may span 12 sub-carriers with a sub-carrier bandwidth of 60 kHz over a 0.125 ms duration or a bandwidth of 15 kHz over a 0.5 ms duration. Each radio frame may consist of 20 or 80 subframes (or NR slots) with a length of 10 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 5 and 6.

The NR RAN may include a central unit (CU) and distributed units (DUs). A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity and may not be used for initial access, cell selection/reselection, or handover. In some cases, DCells may not transmit synchronization signals (SS) in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 3:
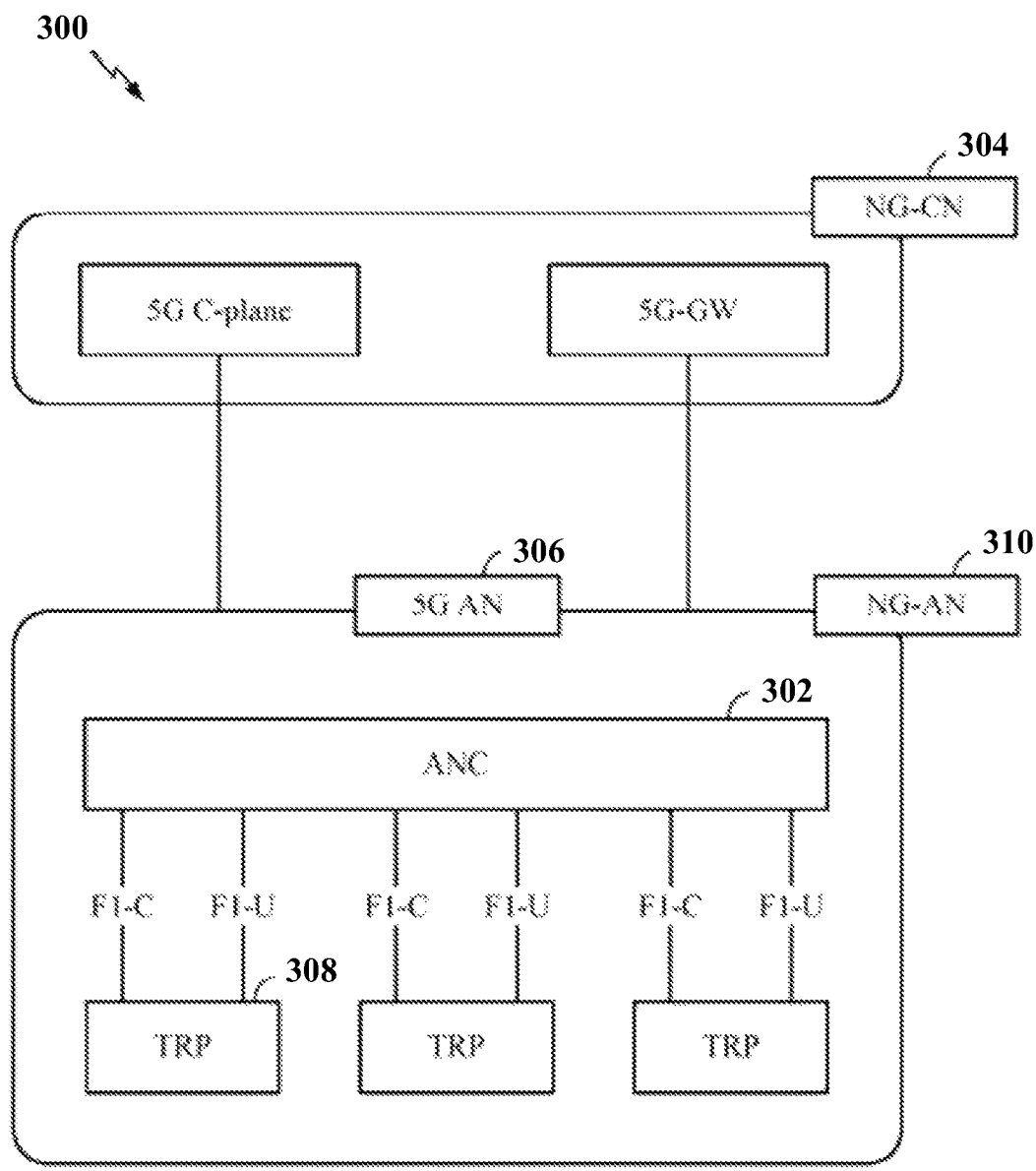
FIG. 3 illustrates an example logical architecture of a distributed access network.

FIG. 3 illustrates an example logical architecture 300 of a distributed RAN, according to aspects of the present disclosure. A 5G access node 306 may include an access node controller (ANC) 302. The ANC may be a central unit (CU) of the distributed RAN 300. The backhaul interface to the next generation core network (NG-CN) 304 may terminate at the ANC. The backhaul interface to neighboring next generation access nodes (NG-ANs) may terminate at the ANC. The ANC may include one or more TRPs 308 (which may also be referred to as BSs, NR BSs, Node Bs, 5G NBs, APs, or some other term). As described above, a TRP may be used interchangeably with "cell."

The TRPs 308 may be a distributed unit (DU). The TRPs may be connected to one ANC (ANC 302) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of the distributed RAN 300 may be used to illustrate fronthaul definition. The architecture may be defined that support fronthauling solutions across different deployment types. For example, the architecture may be based on transmit network capabilities (e.g., bandwidth, latency, and/or jitter). The architecture may share features and/or components with LTE. According to aspects, the next generation AN (NG-AN) 310 may support dual connectivity with NR. The NG-AN may share a common fronthaul for LTE and NR.

The architecture may enable cooperation between and among TRPs 308. For example, cooperation may be preset within a TRP and/or across TRPs via the ANC 302. According to aspects, no inter-TRP interface may be needed/present.

According to aspects, a dynamic configuration of split logical functions may be present within the architecture of the distributed RAN 300. The PDCP, RLC, MAC protocol may be adaptably placed at the ANC or TRP.

Figure 4:
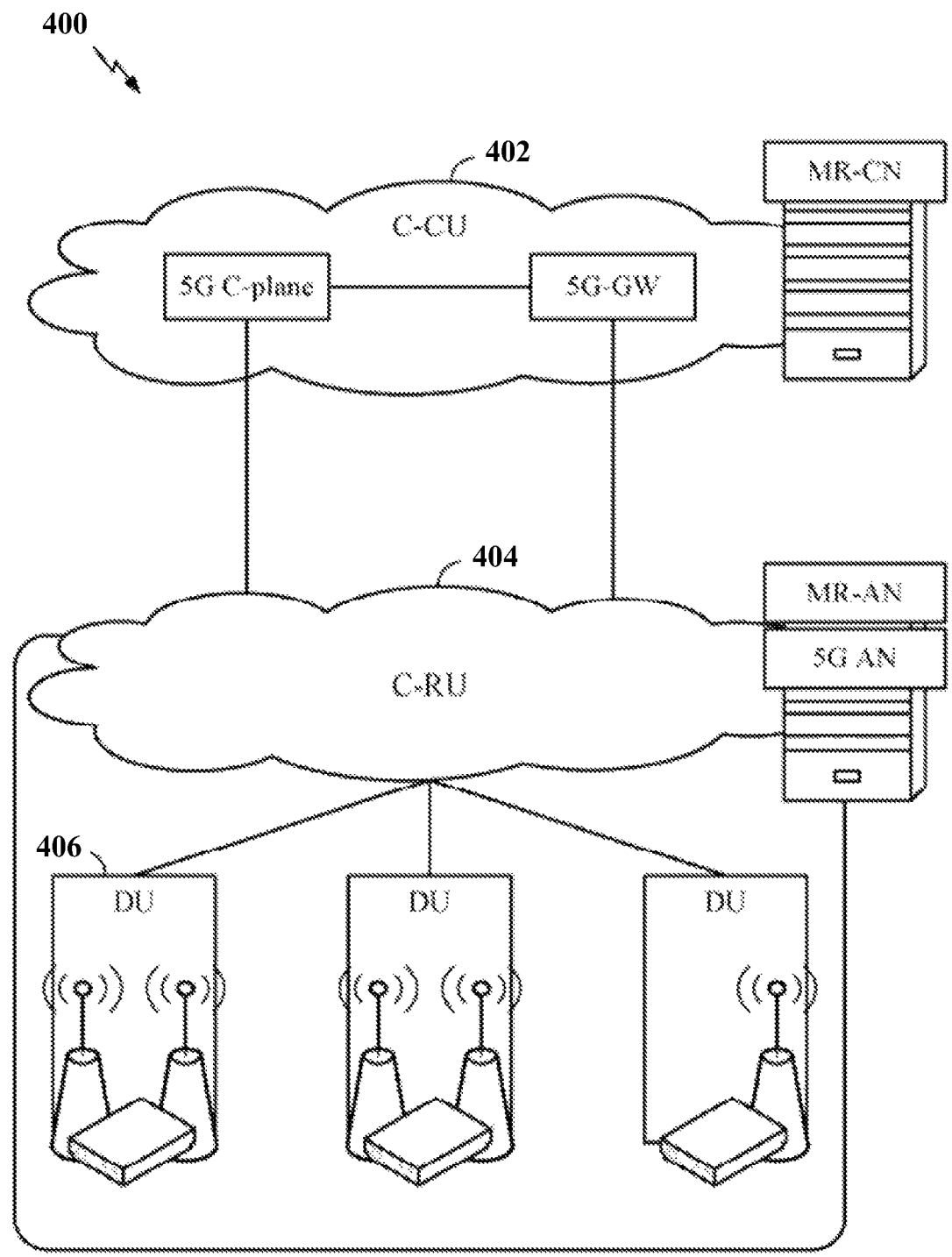
FIG. 4 illustrates an example physical architecture of a distributed access network.

FIG. 4 illustrates an example physical architecture of a distributed RAN 400, according to aspects of the present disclosure. A centralized core network unit (C-CU) 402 may host core network functions. The C-CU may be centrally deployed. C-CU functionality may be offloaded (e.g., to advanced wireless services (AWS)), in an effort to handle peak capacity. A centralized RAN unit (C-RU) 404 may host one or more ANC functions. Optionally, the C-RU may host core network functions locally. The C-RU may have distributed deployment. The C-RU may be closer to the network edge. A distributed unit (DU) 406 may host one or more TRPs. The DU may be located at edges of the network with radio frequency (RF) functionality.

Figure 5:
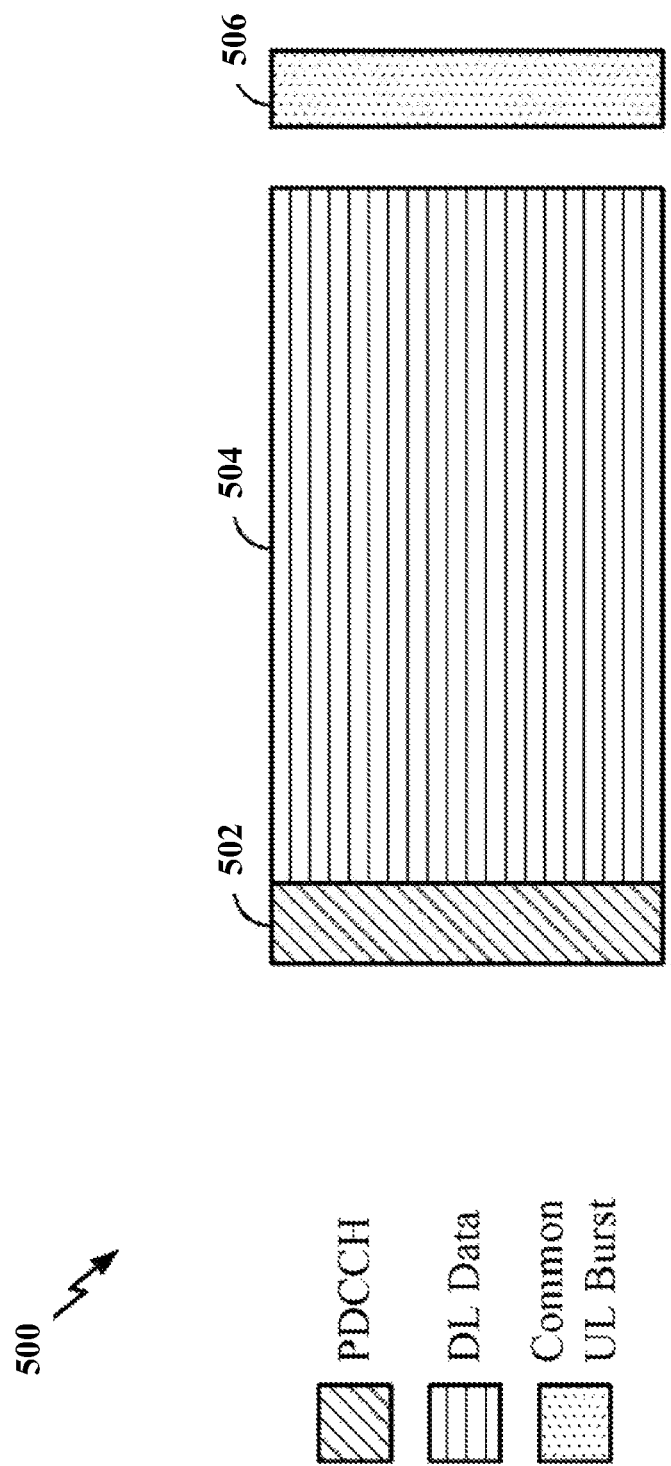
FIG. 5 is a diagram showing an example of a DL-centric subframe.

FIG. 5 is a diagram 500 showing an example of a DL-centric subframe. The DL-centric subframe may include a control portion 502. The control portion 502 may exist in the initial or beginning portion of the DL-centric subframe. The control portion 502 may include various scheduling information and/or control information corresponding to various portions of the DL-centric subframe. In some configurations, the control portion 502 may be a physical DL control channel (PDCCH), as indicated in FIG. 5. The DL-centric subframe may also include a DL data portion 504. The DL data portion 504 may sometimes be referred to as the payload of the DL-centric subframe. The DL data portion 504 may include the communication resources utilized to communicate DL data from the scheduling entity (e.g., UE or BS) to the subordinate entity (e.g., UE). In some configurations, the DL data portion 504 may be a physical DL shared channel (PDSCH).

The DL-centric subframe may also include a common UL portion 506. The common UL portion 506 may sometimes be referred to as an UL burst, a common UL burst, and/or various other suitable terms. The common UL portion 506 may include feedback information corresponding to various other portions of the DL-centric subframe. For example, the common UL portion 506 may include feedback information corresponding to the control portion 502. Non-limiting examples of feedback information may include an ACK signal, a NACK signal, a HARQ indicator, and/or various other suitable types of information. The common UL portion 506 may include additional or alternative information, such as information pertaining to random access channel (RACH) procedures, scheduling requests (SRs), and various other suitable types of information.

As illustrated in FIG. 5, the end of the DL data portion 504 may be separated in time from the beginning of the common UL portion 506. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 6:
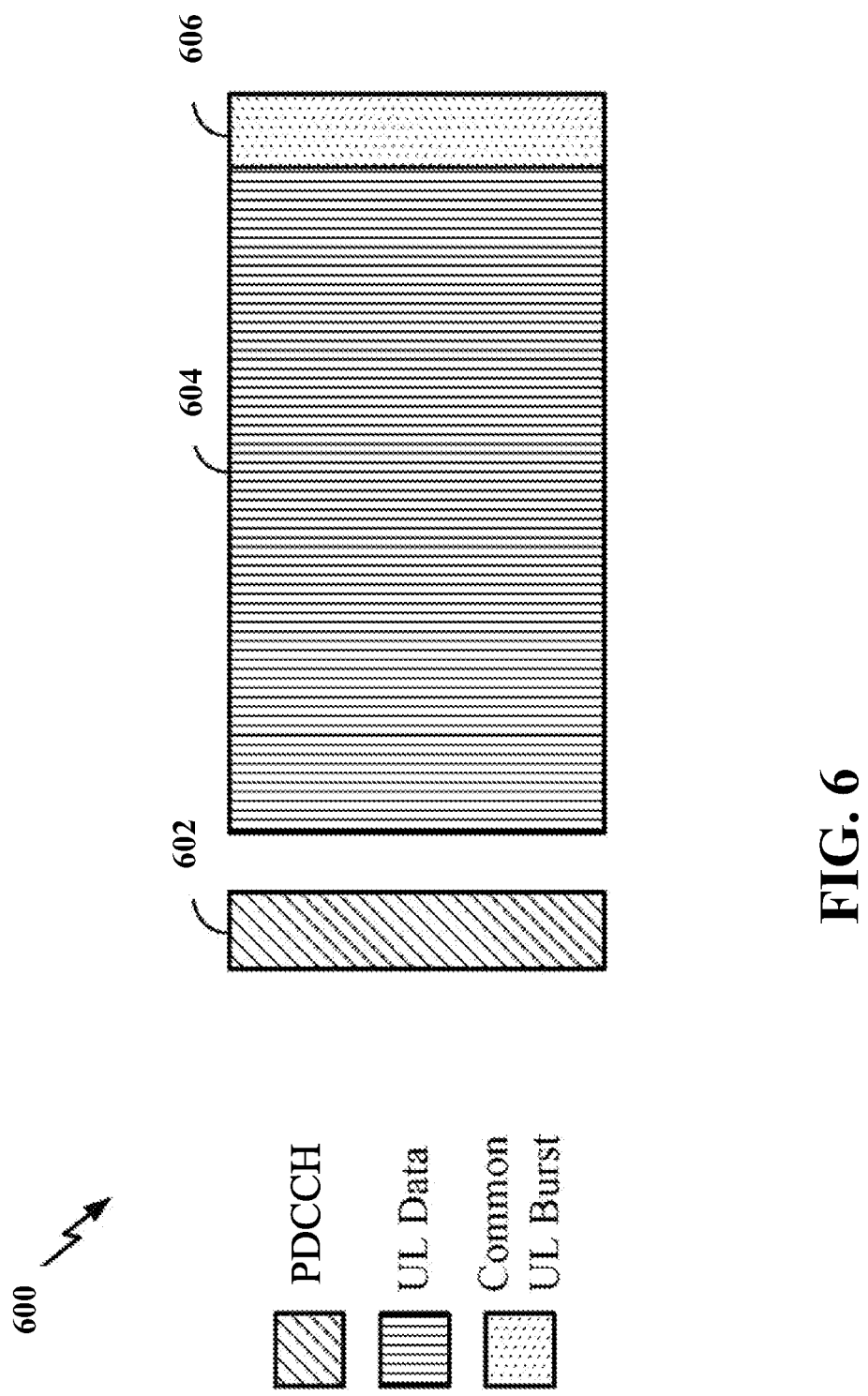
FIG. 6 is a diagram showing an example of an UL-centric subframe.

FIG. 6 is a diagram 600 showing an example of an UL-centric subframe. The UL-centric subframe may include a control portion 602. The control portion 602 may exist in the initial or beginning portion of the UL-centric subframe. The control portion 602 in FIG. 6 may be similar to the control portion 502 described above with reference to FIG. 5. The UL-centric subframe may also include an UL data portion 604. The UL data portion 604 may sometimes be referred to as the pay load of the UL-centric subframe. The UL portion may refer to the communication resources utilized to communicate UL data from the subordinate entity (e.g., UE) to the scheduling entity (e.g., UE or BS). In some configurations, the control portion 602 may be a physical DL control channel (PDCCH).

As illustrated in FIG. 6, the end of the control portion 602 may be separated in time from the beginning of the UL data portion 604. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 606. The common UL portion 606 in FIG. 6 may be similar to the common UL portion 606 described above with reference to FIG. 6. The common UL portion 606 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Figure 7:
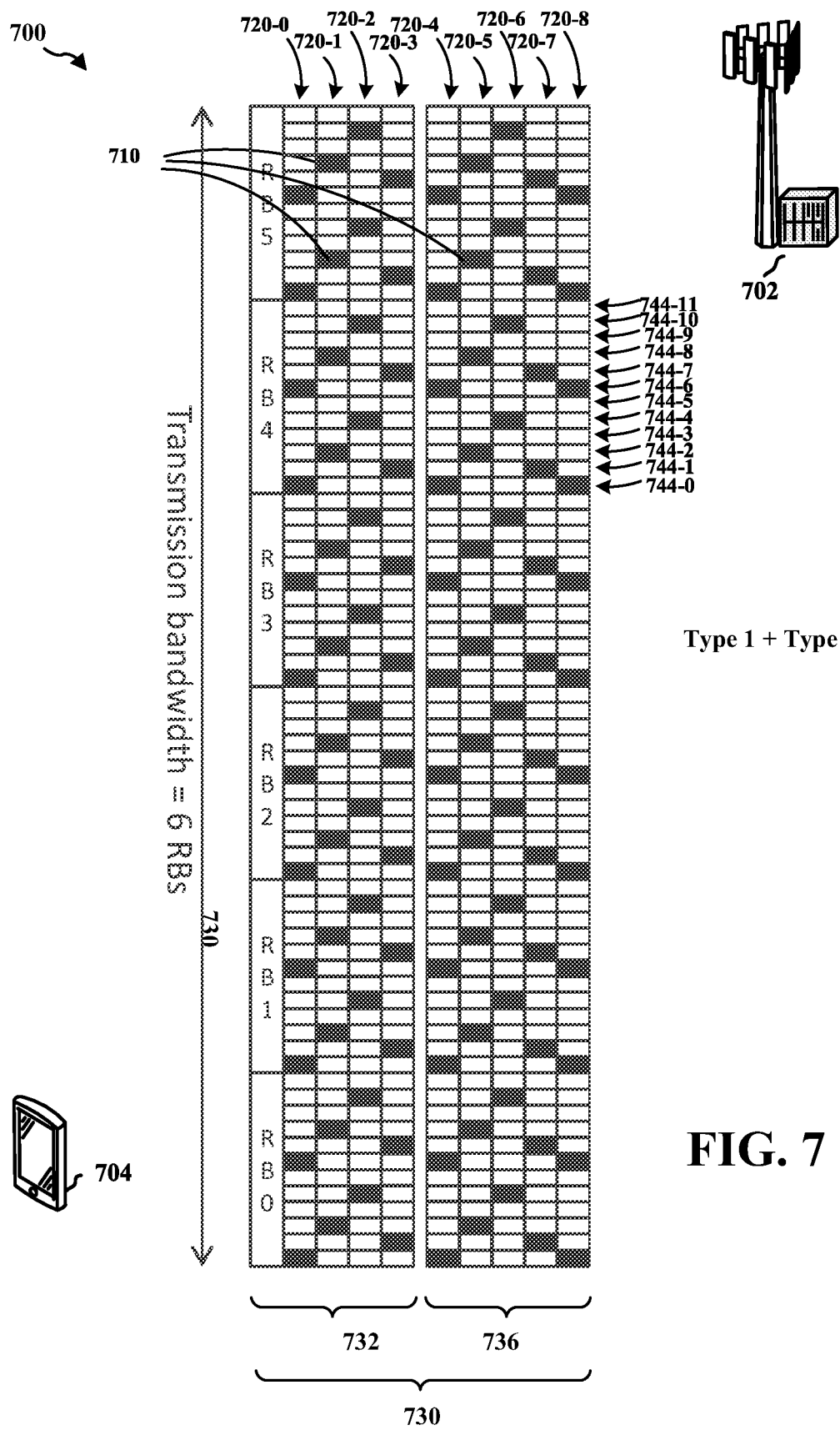
FIG. 7 is a diagram illustrating symbol periods used by a base station for transmitting positioning reference signals to a UE.

FIG. 7 is a diagram 700 illustrating symbol periods used by a base station 702 for transmitting positioning reference signals to a UE 704. The base station 702 may transmits positioning reference signals 710 to the UE 704. In particular, the base station 702 transmits the positioning reference signals 710 in multiple symbol periods. In this example, the positioning reference signals 710 are transmitted in each symbol period of symbol periods 720-0 . . . 720-8. Further, the positioning reference signals 710 are transmitted within a transmission bandwidth 730. In this example, the transmission bandwidth 730 is the same for all symbol periods of the symbol periods 720-0 . . . 720-8 and contains consecutive resource blocks #0 to #5.

The transmission bandwidth 730 is less than or equal to the bandwidth of a carrier used for communication between the base station 702 and the UE 704. The transmission bandwidth 730 may be defined as the consecutive resource blocks on which positioning reference signals 710 are transmitted. The transmission bandwidth 730 may also be defines as the consecutive resource blocks on which only positioning reference signals 710 are allowed to transmit and other signals and reference signals are muted. In this case, the positioning reference signals 710 may be transmitted on a subband within the transmission bandwidth 730, and the resource blocks outside the subband and within the transmission bandwidth 730 are muted without any transmission. A subband is defined as a group of consecutive resource blocks within the transmission bandwidth.

In general, the positioning reference signals 710 are transmitted in N symbol periods 730 containing N1 symbol periods 732 and N2 symbol periods 736. In this example, the N symbol periods 730 is the symbol periods 720-0 . . . 720-8, where N is 9. The N1 symbol periods 732 contains the symbol periods 720-0 to 720-3, wherein N1 is 4. The N2 symbol periods 736 contains the symbol periods 720-4 to 720-8, where N2 is 5.

The base station 702 uses the same antenna port for transmitting the positioning reference signals 710 in the N symbol periods 730. The network may indicate the value of N, N1, and/or N2 to the UE 704 through higher layer signaling. The network can also re-configure the setting through higher layer signaling. Different scrambling sequence may be applied to the positioning reference signals 710 in each symbol period of the N symbol periods 730.

The N1 symbol periods 732 are the first part of the N symbol periods 730 in which the allocation of the positioning reference signals 710 determines the observation range without ambiguity for unknown timing delay measurement. The density of the positioning reference signals in each symbol period in the N1 symbol periods 732 is the same. N1 is an integer greater than 0. Further, there may be three types (Type 1, Type 2, and Type 3) of the positioning reference signal transmission in the N1 symbol periods 732.

In Type 1: in the N1 symbol periods 732, each positioning reference signal 710 in the N1 symbol periods 732 occupies a subcarrier different from subcarriers occupied by other positioning reference signals 710 in the N1 symbol periods 732. Further, positioning reference signals 710 in each symbol period of the N1 symbol periods 732 are evenly distributed on subcarriers of the transmission bandwidth. In other words, the subcarriers occupied by the positioning reference signals 710 in any symbol in the N1 symbol periods 732 do not overlap with subcarriers occupied by other positioning reference signals 710 in the N1 symbol periods 732. The positioning reference signals 710 are allocated in each resource block and are uniformly spanned within the transmission bandwidth in each symbol period in the N1 symbol periods 732.

For example, the resource block #4 contains 12 subcarriers 744-0 to 744-11. In the N1 symbol periods 732, the subcarriers 744-0 to 744-2, the subcarrier 744-4, the subcarriers 744-6 to 744-8, and the subcarrier 744-10 each carry only one positioning reference signal 710. The subcarrier 744-3, the subcarrier 744-5, the subcarrier 744-9, and the subcarrier 744-11 each do not carry any positioning reference signal 710.

Further, in this example, two positioning reference signals 710 are evenly distributed in each of the symbol periods 720-0 to 720-3 (i.e., the N1 symbol periods 732). More specifically, in the symbol period 720-0, the two positioning reference signals 710 are distributed on the subcarrier 744-0 and the subcarrier 744-6, with a spacing of 6 subcarriers. The positioning reference signals 710 in each of the subcarriers 744-1 to 744-3 have similar distribution patterns with a respective offset.

Figure 8:
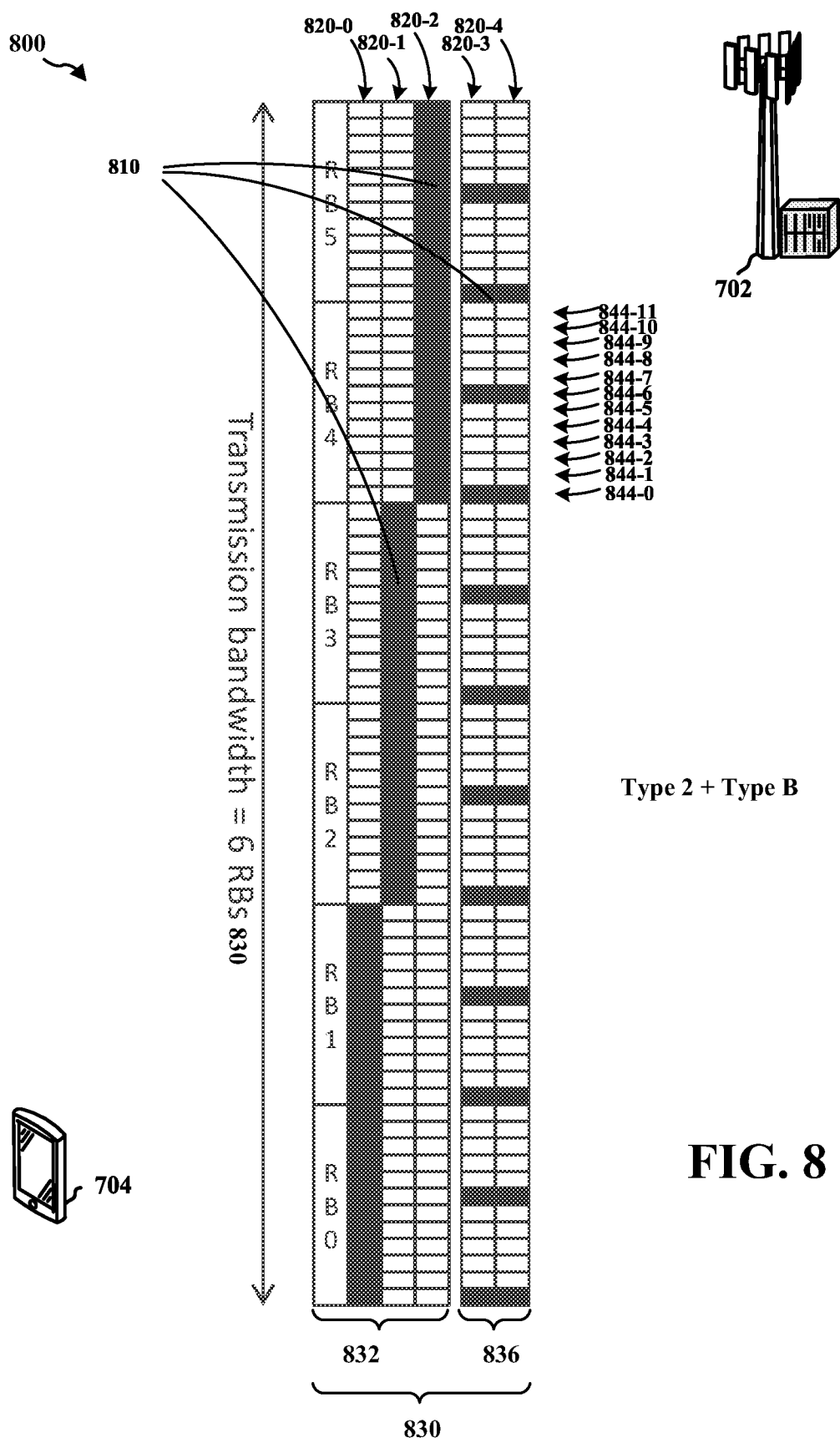
FIG. 8 is another diagram illustrating symbol periods used by a base station for transmitting positioning reference signals to a UE.

FIG. 8 is a diagram 800 illustrating symbol periods used by a base station 702 for transmitting positioning reference signals to a UE 704. The base station 702 may transmits positioning reference signals 810 to the UE 704. In particular, the base station 702 transmits the positioning reference signals 810 in multiple symbol periods. In this example, the positioning reference signals 810 are transmitted in each symbol period of symbol periods 820-0 . . . 820-4. Further, the positioning reference signals 810 are transmitted within a transmission bandwidth 830. In this example, the transmission bandwidth 830 is the same for all symbol periods of the symbol periods 820-0 . . . 820-4 and contains consecutive resource blocks #0 to #5. The transmission bandwidth 830 is similar to the transmission bandwidth 730 described supra.

In general, the positioning reference signals 810 are transmitted in N symbol periods 830 containing N1 symbol periods 832 and N2 symbol periods 836. In this example, the N symbol periods 830 is the symbol periods 820-0 . . . 820-4, where N is 5. The N1 symbol periods 832 contains the symbol periods 820-0 to 820-2, wherein N1 is 3. The N2 symbol periods 836 contains the symbol periods 820-3 to 820-4, where N2 is 2.

In Type 2: in the N1 symbol periods 832, each positioning reference signal 810 in the N1 symbol periods 832 occupies a subcarrier different from subcarriers occupied by other positioning reference signals 810 in the N1 symbol periods 832. Further, the N1 symbol periods correspond to respective N1 segments (subbands) of the transmission bandwidth that do not overlap with each other. In each of the N1 symbol periods, the positioning reference signals 810 are evenly distributed on subcarriers of a respective segment of the transmission bandwidth corresponding to the each symbol period.

In other words, the subcarriers occupied by the positioning reference signals 810 in any symbol in the N1 symbol periods 832 do not overlap with subcarriers occupied by other positioning reference signals 810 in the N1 symbol periods 832. The positioning reference signals 810 are uniformly spanned within a subband of the transmission bandwidth 830 in each symbol period in the N1 symbol periods 832. The subband for transmission in each symbol period does not overlap.

For example, in the symbol period 820-0, the positioning reference signals 810 are transmitted only in resource block #0 and resource block #1. In the symbol period 820-1, the positioning reference signals 810 are transmitted only in resource block #2 and resource block #3. In the symbol period 820-2, the positioning reference signals 810 are transmitted only in resource block #4 and resource block #5. Further, in each resource block (e.g., the resource block #4), the positioning reference signals 810 are transmitted on every subcarrier (e.g., each of the subcarriers 844-0 to 844-11). Therefore, the positioning reference signals 810 are evenly distributed in a resource block.

Figure 9:
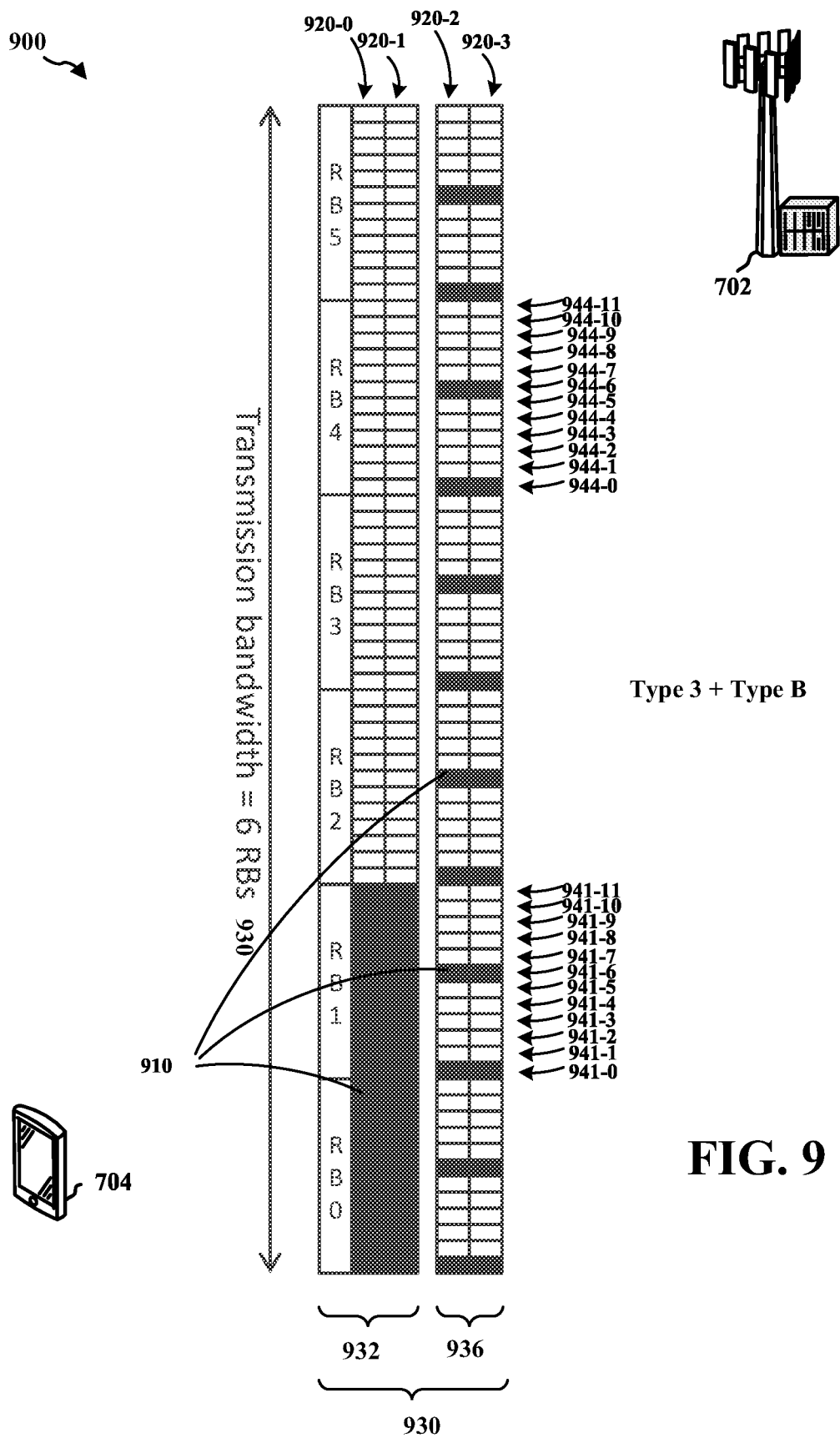
FIG. 9 is yet another diagram illustrating symbol periods used by a base station for transmitting positioning reference signals to a UE.

FIG. 9 is a diagram 900 illustrating symbol periods used by a base station 702 for transmitting positioning reference signals to a UE 704. The base station 702 may transmits positioning reference signals 910 to the UE 704. In particular, the base station 702 transmits the positioning reference signals 910 in multiple symbol periods. In this example, the positioning reference signals 910 are transmitted in each symbol period of symbol periods 920-0 . . . 920-3. Further, the positioning reference signals 910 are transmitted within a transmission bandwidth 930. In this example, the transmission bandwidth 930 is the same for all symbol periods of the symbol periods 920-0 . . . 920-3 and contains consecutive resource blocks #0 to #5. The transmission bandwidth 930 is similar to the transmission bandwidth 730 described supra.

In general, the positioning reference signals 910 are transmitted in N symbol periods 930 containing N1 symbol periods 932 and N2 symbol periods 936. In this example, the N symbol periods 930 is the symbol periods 920-0 . . . 920-3, where N is 4. The N1 symbol periods 932 contains the symbol periods 920-0 to 920-1, wherein N1 is 2. The N2 symbol periods 936 contains the symbol periods 920-2 to 920-3, where N2 is 2.

In Type 3: subcarriers occupied by the positioning reference signals 910 in each of the N1 symbol periods 932 are the same and are evenly distributed in a segment (subband) of the transmission bandwidth 930. In other words, the subcarriers occupied by the positioning reference signals 910 in any symbol period in the N1 symbol periods 932 are the same as the subcarriers occupied by positioning reference signals 910 in other symbol periods in the N1 symbol periods 932. The positioning reference signals 910 are uniformly spanned within a subband of the transmission bandwidth 930 in each symbol period in the N1 symbol periods 932. The density of the positioning reference signals 910 in the subband in Type 3 configuration could be higher than the density in Type 1 configuration.

For example, the positioning reference signals 910 are transmitted on the same subcarriers (e.g., all the subcarriers) in symbol periods 920-0 to 920-1. Further, in each resource block (e.g., the resource block #1), the positioning reference signals 910 are transmitted on every subcarrier (e.g., each of the subcarriers 941-0 to 941-11). Therefore, the positioning reference signals 910 are evenly distributed in a resource block.

The N2 symbol periods 736 are the second part of the N symbol periods 730 in which the allocation of positioning reference signals 710 determines the UE processing gain on received SINR improvement. The N2 symbol periods 836 and the N2 symbol periods 936 have similar characteristics.

The density of the positioning reference signals 710 in each symbol period in the N2 symbol periods 736 is the same. N2 is an integer greater than or equal to 0, and N2 can be larger than N1. There may be two types (Type A and Type B) of the transmission of the positioning reference signals in the N2 symbol periods.

In Type A: the subcarriers occupied by the multiple positioning reference signals transmitted in the N2 symbol periods are a subset of subcarriers occupied by the first part of the multiple positioning reference signals transmitted in the N1 symbol periods. The positioning reference signals in each symbol period of the N2 symbol periods are evenly distributed on subcarriers of the transmission bandwidth. In other words, the subcarriers occupied by the positioning reference signals in the N2 symbol periods are a subset of the subcarriers occupied by the positioning reference signals in the N1 symbol periods. The positioning reference signals are uniformly spanned within the transmission bandwidth in each symbol in the N2 symbol periods.

This means, the occupied subcarriers in the N2 symbol periods are overlapped with occupied subcarriers in the N1 symbols. The occupied subcarriers in the N1 symbols may be partially overlapped with that in the N2 symbol periods. When N2 is greater than N1, this means in N2 symbol periods, there are some subcarriers on which positioning reference signals are transmitted in at least in two symbol periods.

Referring back to FIG. 7, the N2 symbol periods 736 (i.e., the symbol periods 720-4 to 720-8) has more symbol periods than the N1 symbol periods 732 (i.e., the symbol periods 720-0 to 720-3). The positioning reference signals 710 in the symbol periods 720-4 to 720-7 has the same distribution pattern as the distribution pattern of the symbol periods 720-0 to 720-3. Then, the distribution pattern in the symbol period 720-8 is the same as the distribution pattern in the symbol period 720-0.

In Type B: the subcarriers occupied by the positioning reference signals transmitted in the N2 symbol periods at least partially overlap with subcarriers occupied by the multiple positioning reference signals transmitted in the N1 symbol periods. A portion of the second part of the multiple positioning reference signals is evenly distributed on subcarriers of the transmission bandwidth in each of the N2 symbol periods.

In other words, the subcarriers occupied by the positioning reference signals in the N2 symbol periods may be at least partially overlap with the subcarriers occupied by the positioning reference signals in the N1 symbol periods. The positioning reference signals are uniformly spanned within the transmission bandwidth in each symbol period in the N2 symbol periods.

Referring back to FIG. 8, the positioning reference signals 810 in the symbol period 820-3 and the positioning reference signals 810 in the symbol period 820-4 are evenly distributed in the transmission bandwidth 830 and are on the same subcarriers (e.g., the subcarrier 844-0 and the subcarrier 844-6 in the resource block #4). Further, the positioning reference signals 810 in the N1 symbol periods 832 also occupies those subcarriers (e.g., the subcarrier 844-0 and the subcarrier 844-6 in the resource block #4).

The N1 symbol periods (e.g., the N1 symbol periods 732, the N1 symbol periods 832, and the N1 symbol periods 932) can be named as a base block. When N2 is greater than 0, the N2 symbol periods (e.g., the N2 symbol periods 736, the N2 symbol periods 836, and the N2 symbol periods 936) can be named as an enhancement block. The N symbol periods (e.g., the N symbol periods 730, the N symbol periods 830, and the N symbol periods 930) can be named as an extended block. For the coordinated cells for positioning purpose, the network can determine the suitable number of N1 and N2, and the suitable combination of the transmission type to fit for the deployment scenario. In certain configurations, the suitable combinations are as the follows: (a) Type 1 in the base block and Type A in the enhancement block, and the density of positioning reference signals in the base block and the enhancement block can be the same; (b) Type 2 in the base block and Type B in the enhancement block, and the density of positioning reference signals in the base block and the enhancement block may be different; and (c) Type 3 in the base block and Type B in the enhancement block, and the density of positioning reference signals in the base block and the enhancement block may be different. The allocation of positioning reference signals in the base block can determine the observation range without ambiguity for unknown timing delay measurement. The allocation of positioning reference signal in the enhancement block can determine the UE processing gain on received SINR improvement, when N2>=0.

The base station 702 transmits the positioning reference signals (e.g., the positioning reference signals 710, the positioning reference signals 810, and the positioning reference signals 910) within the transmission bandwidth in the N symbol periods within a single slot. For example, when a single slot has 14 symbol periods, N1+N2≤14.

If symbol periods within the transmission bandwidth within a slot are not used for the transmission of the positioning reference signals or for the transmission of PDCCHs, in certain configurations, the resource elements in some of these symbol periods and within the transmission bandwidth in a slot are not used for any transmission.

The base station 702 can transmit with repetition of the N symbol periods (e.g., the N symbol periods 730, the N symbol periods 830, and the N symbol periods 930) in consecutive slots. The starting symbol period for the transmission in different slots can be shifted as a way to randomize the interference. There may be several pre-configured symbol period positions in a slot that can be used as the starting symbol period position for the transmission of positioning reference signals.

The transmission of positioning reference signals in a base block or an extended block represents the transmission of using the same downlink transmission filter in these symbol periods. As the transmission of positioning reference signals in different base blocks or extended blocks uses different downlink transmission filters, this is the behavior of beam sweeping. As the transmission of positioning reference signals in different base blocks or extended blocks uses the same downlink transmission filter, this is the behavior of repetition. Different base blocks or extended blocks can be indicated using same downlink transmission filter or not.

Different antenna ports can be assigned to different base blocks or extended blocks, for the purposes of line-of-sight (LOS) detection. The transmission of two reference signal blocks from different antenna port can map to the REs in the form of TDM, FDM and CDM. A resource for positioning (the base blocks or extended blocks) can be configured with two antenna ports. In each symbol period of a resource for positioning, the occupied subcarriers by different antenna ports are non-overlapping, or the occupied subcarriers by different antenna ports are overlapping through orthogonal cover code for separation.

The base station 702 may transmit positioning reference signal parameters to the UE 704 through a higher layer signaling (e.g., Radio Resource Control (RRC) signaling or Positioning Protocol). The base blocks or extended blocks may be configured considering the following aspects: the density of the positioning reference signals in frequency domain in a base block; configuration of N1 value for a base block; positioning reference signal subcarrier offset pattern across symbols in a base block; the density of positioning reference signals in frequency domain in an enhancement block; configuration of N2 value for an enhancement block; and positioning reference signal subcarrier offset pattern across symbols in an enhancement block.

Other aspects as follows may also be considered: the mapping of a block to resource element; the symbol periods in a base block maps to consecutive symbols in a slot; the symbol periods in a base block maps to non-consecutive symbols in a slot; the resource blocks in a base block maps to consecutive resource blocks in a slot; consecutive resource block allocation denotes the transmission bandwidth; the relationship of base blocks or extended blocks, beam transmission, and bursts; and the scrambling sequence in each base block or extended block.

The several consecutive slots of having a base block or extended block for positioning in each slot may be are formed as a burst (or occasion) for positioning. The burst transmission can be done in periodic, aperiodic and semi-persistent way. The number of base blocks or extended blocks in each slot in a burst may be the same. For periodic or semi-persistent transmission, the structure among the bursts may be the same. The base blocks or extended blocks in a burst can be transmitted through beam sweeping by using different downlink transmission filter. Some of base blocks or extended blocks can be transmitted using the same downlink transmission filter. This means, in a burst, the transmission of different blocks includes the repetition of using same beam (same transmission filter), and also includes using different beams (different transmission filters).

Figure 10:
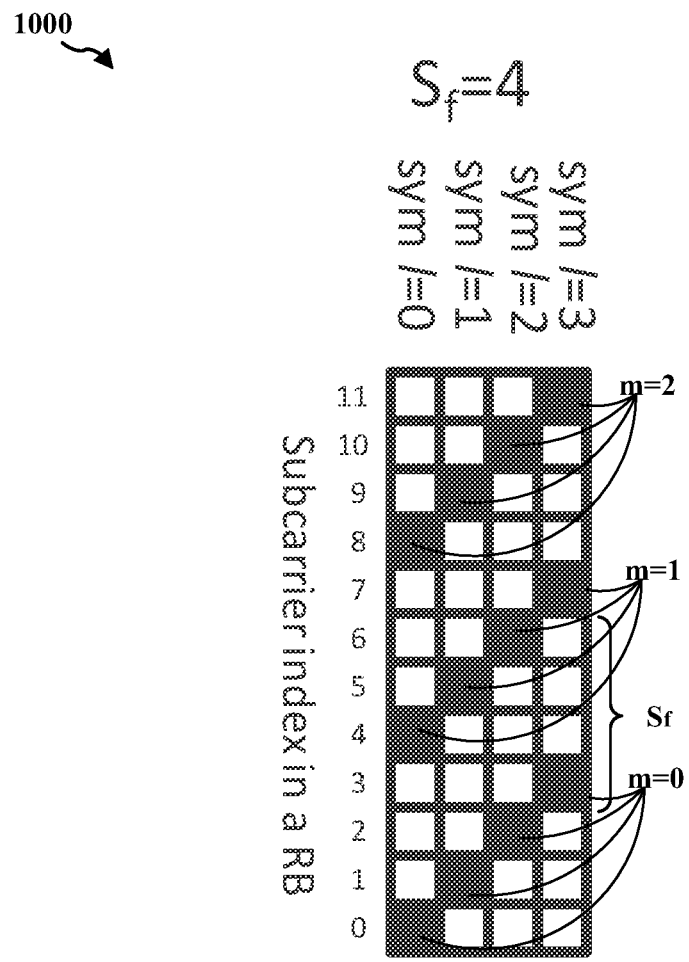
FIG. 10 is a diagram illustrating a first pattern for transmitting positioning reference signals from a base station to a UE.

FIG. 10 is a diagram illustrating a first transmission pattern of a base block 1000 having N1 symbol periods in a bandwidth of an initial resource block. $S_f$ denotes the number of subcarriers between two adjacent subcarriers carrying positioning reference signals in a particular symbol period. l denotes a symbol period index of a particular symbol period in the N1 symbol periods and starts from 0. $V_{shift}$, as specified by the positioning reference signal parameters, indicates a subcarrier shift of an initial subcarrier carrying a positioning reference signal relative to subcarrier 0 in the resource block. Each resource block contains 12 subcarriers. B denotes the number of resource blocks within the transmission bandwidth. m is an integer between 0 and $((12/S_f)*B-1)$ inclusive and is an index of only the subcarriers carrying positioning reference signals in a particular symbol period.

The positioning reference signals occupy the subcarriers with the subcarrier index at $S_f*m+n$, where m=0, 1, 2, ... $12/S_f*B-1$. For $S_f=1, 2, 3, 4, 6, 12$, B can be an even or odd number; for $S_f$ is 8, B is even number.

The positioning reference signals occupy the subcarriers with the subcarrier index at $(S_f*m+n)$ limiting to less than 12*B, where m is 0, 1, 2, ..., $\lfloor 12/S_f*B \rfloor$. For $S_f$ is 8, B can be even or odd number.

As such, the subcarrier index, in all the subcarriers within the transmission bandwidth, of the subcarriers carrying positioning reference signals in accordance with the transmission pattern shown in FIG. 10 are:

$$S_f*m+(l+V_{shift}) \bmod S_f.$$

Figure 11:
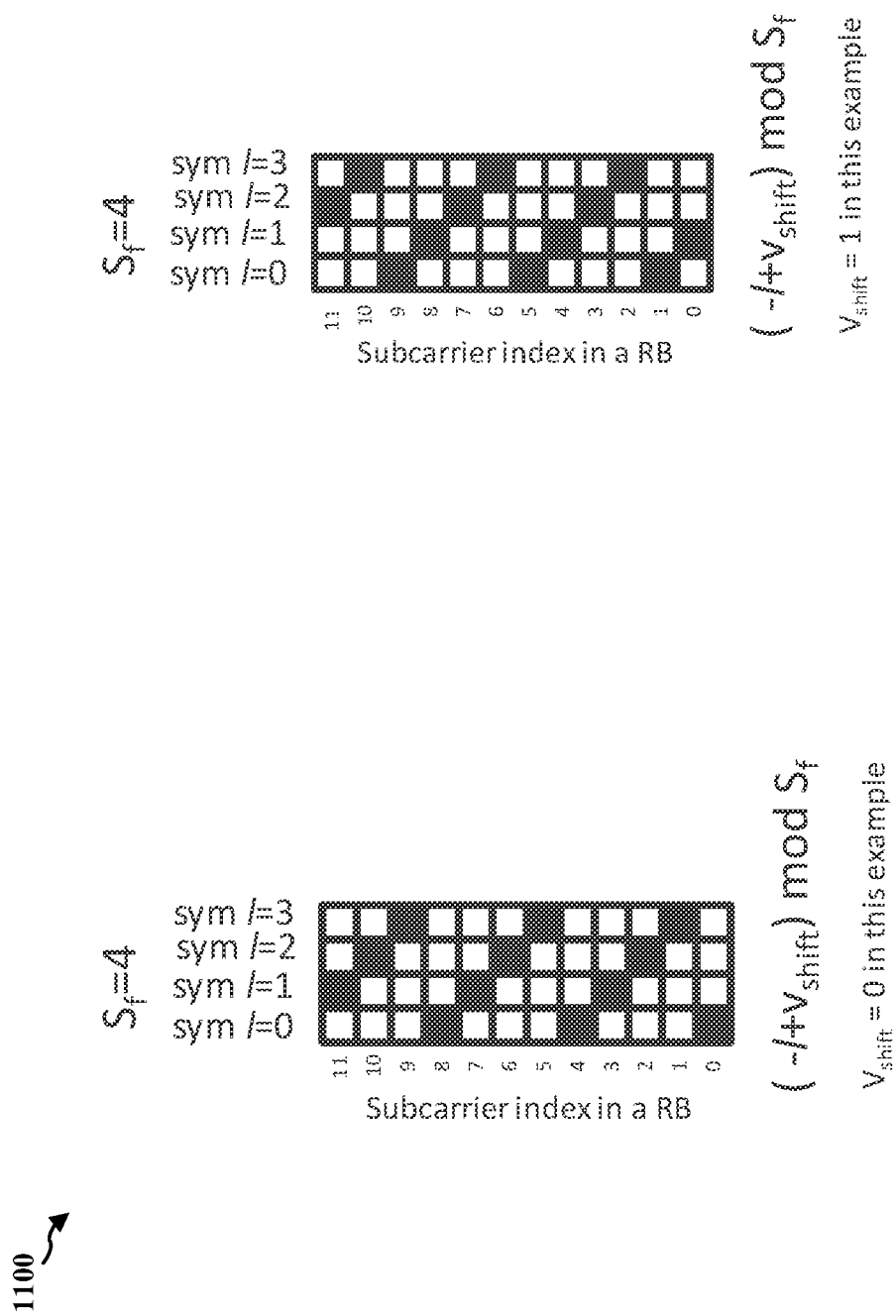
FIG. 11 is a diagram illustrating a second pattern for transmitting positioning reference signals from a base station to a UE.

FIG. 11 is a diagram illustrating a second transmission pattern of a base block 1100 having N1 symbol periods in a bandwidth of an initial resource block. The parameters used in this figure are the same as those in FIG. 10. The subcarrier index, in all the subcarriers within the transmission bandwidth, of the subcarriers carrying positioning reference signals in accordance with the transmission pattern shown in FIG. 11 are:

$$S_f*m+(-l+V_{shift}) \bmod S_f.$$

Figure 12:
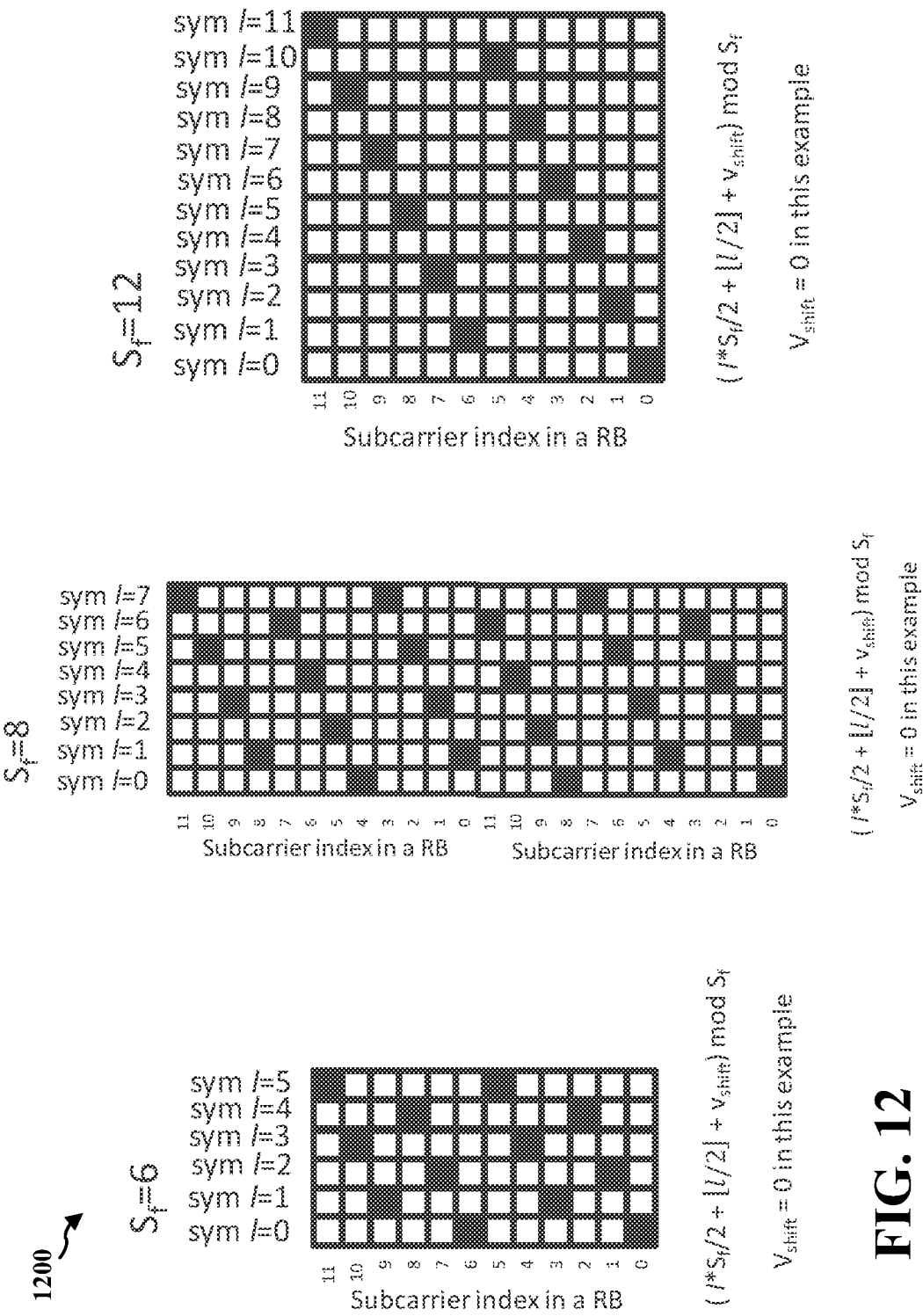
FIG. 12 is a diagram illustrating a third pattern for transmitting positioning reference signals from a base station to a UE.

FIG. 12 is a diagram illustrating a third transmission pattern of a base block 1200 having N1 symbol periods in a bandwidth of an initial resource block. The parameters used in this figure are the same as those in FIG. 10. The subcarrier index, in all the subcarriers within the transmission bandwidth, of the subcarriers carrying positioning reference signals in accordance with the transmission pattern shown in FIG. 12 are:

$$S_f*m+\left(l*\frac{S_f}{2}+\left\lfloor\frac{l}{2}\right\rfloor+V_{shift}\right) \bmod S_f.$$

This transmission pattern may be used in particular when $S_f$ is 4, 6, or 8. The occupied subcarriers in the first two symbol periods are equally spaced with spacing reduced to $S_f/2$.

Further, similarly, the transmission pattern may also be $$S_f*m+\left(-l*\frac{S_f}{2}+\left\lfloor\frac{l}{2}\right\rfloor+V_{shift}\right) \bmod S_f,$$

$$S_f*m+\left(-l*\frac{S_f}{2}-\left\lfloor\frac{l}{2}\right\rfloor+V_{shift}\right) \bmod S_f, \text{ and}$$

$$S_f*m+\left(l*\frac{S_f}{2}-\left\lfloor\frac{l}{2}\right\rfloor+V_{shift}\right) \bmod S_f.$$

Figure 13:
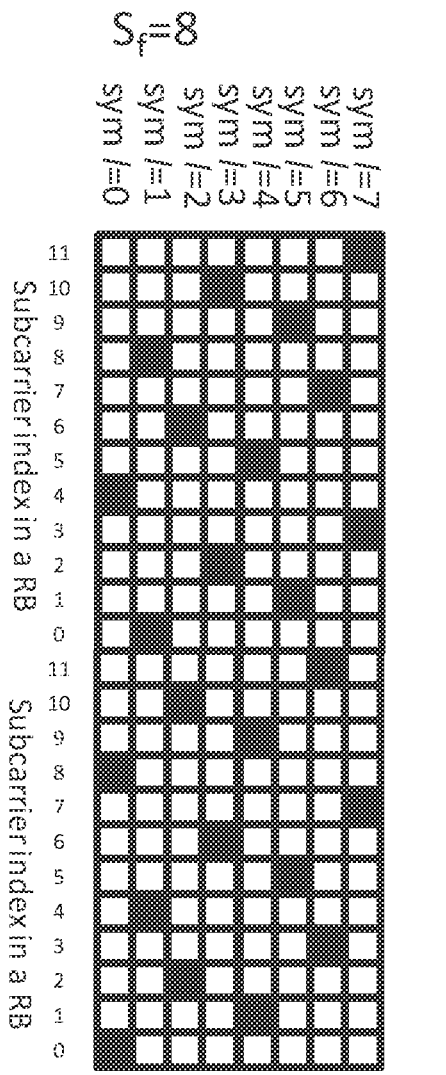
FIG. 13 is a diagram illustrating a fourth pattern for transmitting positioning reference signals from a base station to a UE.

FIG. 13 is a diagram illustrating a fourth transmission pattern of a base block 1300 having N1 symbol periods in a bandwidth of two initial resource blocks. The parameters used in this figure are the same as those in FIG. 10. The subcarrier index, in all the subcarriers within the transmission bandwidth, of the subcarriers carrying positioning reference signals in accordance with the transmission pattern shown in FIG. 13 are:

$$S_f*m+\left(l*\frac{S_f}{2}+\left(\left(2*\left\lfloor\frac{l}{2}\right\rfloor\right)\bmod\left(\frac{S_f}{2}\right)\right)+\left\lfloor\frac{l}{4}\right\rfloor+V_{shift}\right) \bmod S_f.$$

The occupied subcarriers in the first two symbols are equally spaced with spacing reduced to $S_f/2$, and the occupied subcarriers in the first four symbols are equally spaced with spacing reduced to $S_f/4$.

Figure 14:
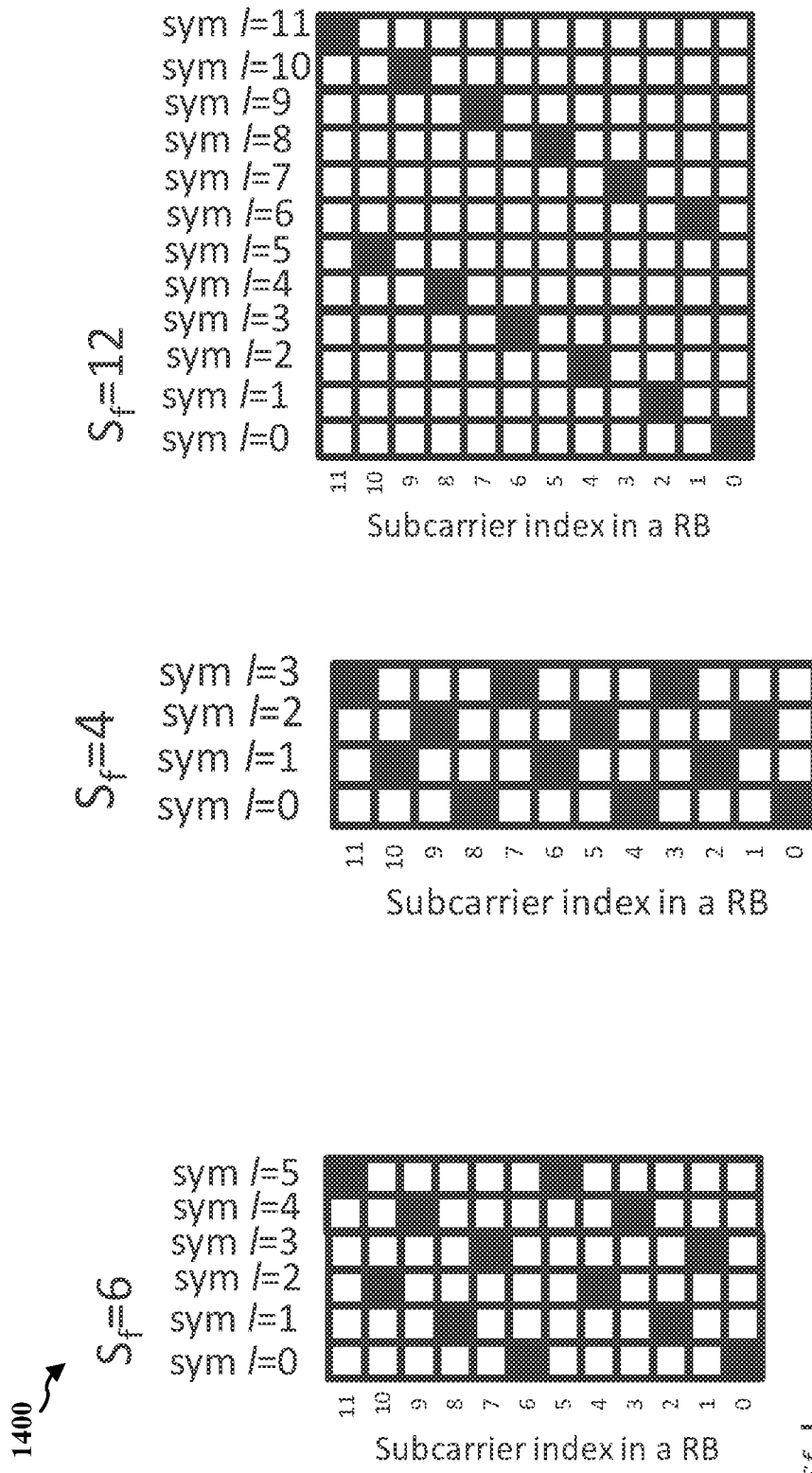
FIG. 14 is a diagram illustrating a fifth pattern for transmitting positioning reference signals from a base station to a UE.

FIG. 14 is a diagram illustrating a fifth transmission pattern of a base block 1400 having N1 symbol periods in a bandwidth of an initial resource block. The parameters used in this figure are the same as those in FIG. 10. The subcarrier index, in all the subcarriers within the transmission bandwidth, of the subcarriers carrying positioning reference signals in accordance with the transmission pattern shown in FIG. 14 are:

$$S_f*m+\left(\left\lfloor\frac{l}{\left(\frac{S_f}{2}\right)}\right\rfloor+2*\left(l\bmod\left(\frac{S_f}{2}\right)\right)+V_{shift}\right) \bmod S_f.$$

This transmission pattern may be used in particular when $S_f$ is 2, 4, 6, 8, or 12.

Figure 15:
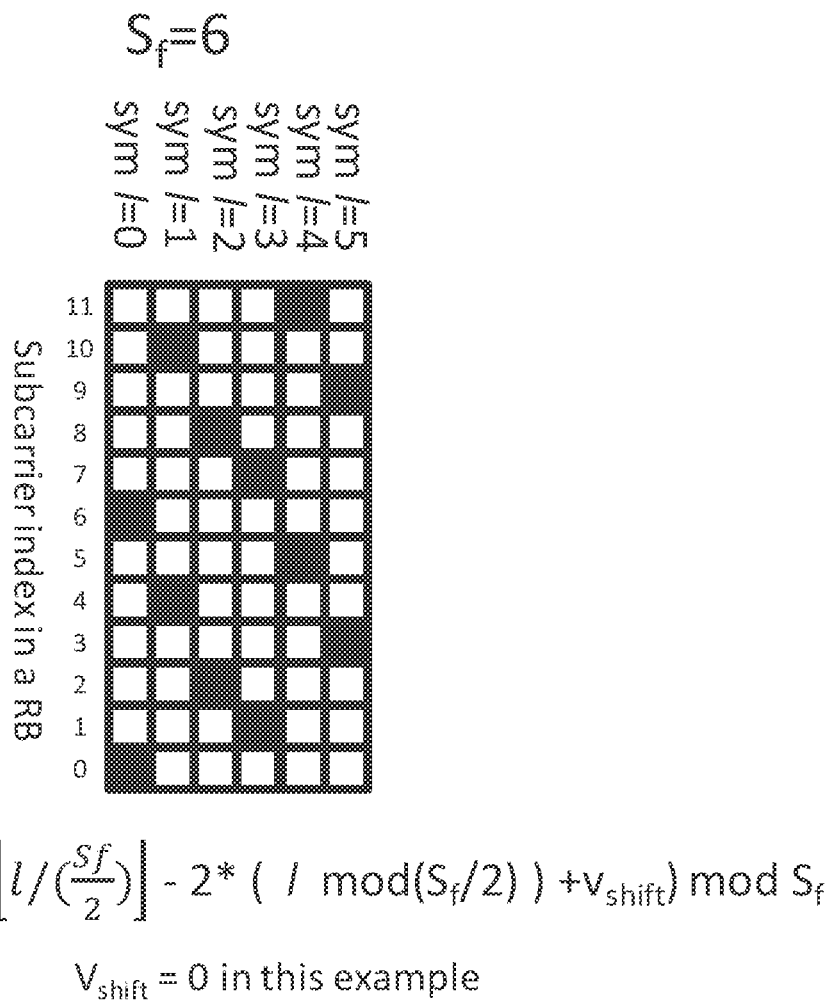
FIG. 15 is a diagram illustrating a sixth pattern for transmitting positioning reference signals from a base station to a UE.

FIG. 15 is a diagram illustrating a sixth transmission pattern of a base block 1500 having N1 symbol periods in a bandwidth of an initial resource block. The parameters used in this figure are the same as those in FIG. 10. The subcarrier index, in all the subcarriers within the transmission bandwidth, of the subcarriers carrying positioning reference signals in accordance with the transmission pattern shown in FIG. 15 are:

$$S_f*m+\left(\left\lfloor\frac{l}{\left(\frac{S_f}{2}\right)}\right\rfloor-2*\left(l\bmod\left(\frac{S_f}{2}\right)\right)+V_{shift}\right) \bmod S_f.$$

This transmission pattern may be used in particular when $S_f$ is 2, 4, 6, 8, or 12.

Figure 16:
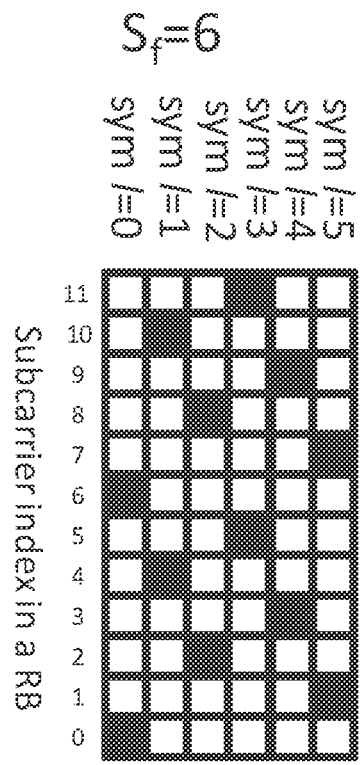
FIG. 16 is a diagram illustrating a seventh pattern for transmitting positioning reference signals from a base station to a UE.

FIG. 16 is a diagram illustrating a seventh transmission pattern of a base block 1600 having N1 symbol periods in a bandwidth of an initial resource block. The parameters used in this figure are the same as those in FIG. 10. The subcarrier index, in all the subcarriers within the transmission bandwidth, of the subcarriers carrying positioning reference signals in accordance with the transmission pattern shown in FIG. 16 are:

$$S_f * m + \left( -\left\lfloor \frac{l}{\left(\frac{S_f}{2}\right)} \right\rfloor - 2*\left(l \bmod\left(\frac{S_f}{2}\right)\right) + V_{shift} \right) \bmod S_f.$$

This transmission pattern may be used in particular when $S_f$ is 2, 4, 6, 8, or 12. Further, similarly, the transmission pattern may also be $$S_f * m + \left( -\left\lfloor \frac{l}{\left(\frac{S_f}{2}\right)} \right\rfloor + 2*\left(l \bmod\left(\frac{S_f}{2}\right)\right) + V_{shift} \right) \bmod S_f.$$

When N1 is 2, 3, or 4, the transmission patterns:

$S_f*m+(l+V_{shift}) \bmod S_f,$ $S_f*m+(-l+V_{shift}) \bmod S_f,$ and $S_f*m+(+/-\lfloor l/(S_f/2) \rfloor +/-2*(l \bmod (S_f/2))+V_{shift}) \bmod S_f$ described supra referring to FIGS. 10, 11, 14, 15, and 16 may achieve whole OFDM symbol time observation from the UE perspective for $S_f$ is 4. N2 can be a value between 0 to (14−N1) inclusive.

When N1 is 3, 4, 5, or 6, the transmission patterns:

$S_f*m+(l+V_{shift}) \bmod S_f,$ $S_f*m+(-l+V_{shift}) \bmod S_f,$ and $S_f*m+(+/-\lfloor l/(S_f/2 +/-\rfloor l/2 + V_{shift}) \bmod S_f$ and $S_f*m+(+/-\lfloor l/(S_f/2) \rfloor +/-2*(l \bmod (S_f/2))+V_{shift}) \bmod S_f$ described supra referring to FIGS. 10, 11, 12, 14, 15, and 16 may achieve whole OFDM symbol time observation from the UE perspective for $S_f$ is 6. N2 can be a value between 0 to (14−N1) inclusive.

When N1 is 2 or 3, the transmission patterns:

$S_f*+m(l+V_{shift}) \bmod S_f,$ and $S_f*m+(-l+V_{shift}) \bmod S_f$ described supra referring to FIGS. 10 and 11 may achieve whole OFDM symbol time observation from the UE perspective for $S_f$ is 3. N2 can be a value between 0 to (14−N1) inclusive.

When N1 is 2, the transmission patterns:

$S_f*m \pm (l+V_{shift}) \bmod S_f,$ and $S_f*m+(-l+V_{shift}) \bmod S_f$ described supra referring to FIGS. 10 and 11 may achieve whole OFDM symbol time observation from the UE perspective for $S_f$ is 2. N2 can be a value between 0 to (14−N1) inclusive.

When N1 is 4, 5, 6, 7, or 8, the transmission patterns:

$S_f*m+(l+V_{shift}) \bmod S_f,$ $S_f*m \pm (-l+V_{shift}) \bmod S_f,$ $S_f*m+(+/-l*S_f2+/-\lfloor 2 \rfloor +V_{shift}) \bmod S_f,$ $S_f*m+(+/-\lfloor l/(S_f2) \rfloor +/-2*(l \bmod(S_f2))+V_{shift}) \bmod S_f,$ and $S_f*m+(l*S_f2+(2*\lfloor l/2 \rfloor) \bmod(S_f2)+\lfloor l/4 \rfloor +V_{shift}) \bmod S_f$ described supra referring to FIGS. 10, 11, 12, 13, 14, 15, and 16 may achieve whole OFDM symbol time observation from the UE perspective for $S_f$ is 8. N2 can be a value between 0 to (14−N1) inclusive.

When N1 is 6, 7, 8, 9, 10, 11, or 12, the transmission patterns:

$S_f*m+(l+V_{shift}) \bmod S_f,$ $S_f*m+(-l+V_{shift}) \bmod S_f,$ $S_f*m+(+/-l*S_f2+/-\lfloor l/2 \rfloor +V_{shift}) \bmod S_f,$ and $S_f*m+(+/-\lfloor l/(S_f2) \rfloor +/-2*(l \bmod(S_f2))+V_{shift}) \bmod S_f$ described supra referring to FIGS. 10, 11, 12, 14, 15, and 16 may achieve whole OFDM symbol time observation from the UE perspective for $S_f$ is 12. N2 can be a value between 0 to (14−N1) inclusive.

When N2 is greater than 0, the transmission pattern in the N2 symbol periods is sequentially equal to the transmission pattern in the N1 symbol periods starting from l=0. When reaching to the last symbol period in the N1 symbol periods for the condition of N2 is greater than N1, the transmission pattern is equal to the transmission pattern in the N1 symbol periods again starting from l=0 (wrap around).

If a control resource set (CORESET) is transmitted in the first $N_c$ symbol periods within a slot, and if the resource blocks within the first $N_c$ symbol periods is within the transmission bandwidth of RS for positioning and these resource blocks are outside CORESET, then, the network can signal the UE to indicate that these resource blocks are also used to transmit positioning reference signals, with the following transmission configurations: (a) the $S_f$ in the enhancement block is the same as the $S_f$ in the base block; and (b) the transmission pattern in the $N_c$ symbol periods is sequentially equal to the $(N1-N_c+1)^{th}, \ldots, N1^{th}$ symbol periods in the base block.

A group of coordinated cells may determine the following positioning reference signal parameters and report to the location server. The location server indicates these positioning reference signal parameters to the UE through higher layer signaling for each cell in coordinated cells. The positioning reference signal parameters may include one or more block parameters: $S_f$, value of N1 and N2, or N1+N2; transmission pattern parameters; starting symbol period for the transmission of each block; and $V_{shift}$, which can be implicitly indicated through using scrambling ID. The positioning reference signal parameters may include one or more burst parameters: number of blocks within a burst for transmission; and an indication of a transmission filter for each block within a burst.

Figure 17:
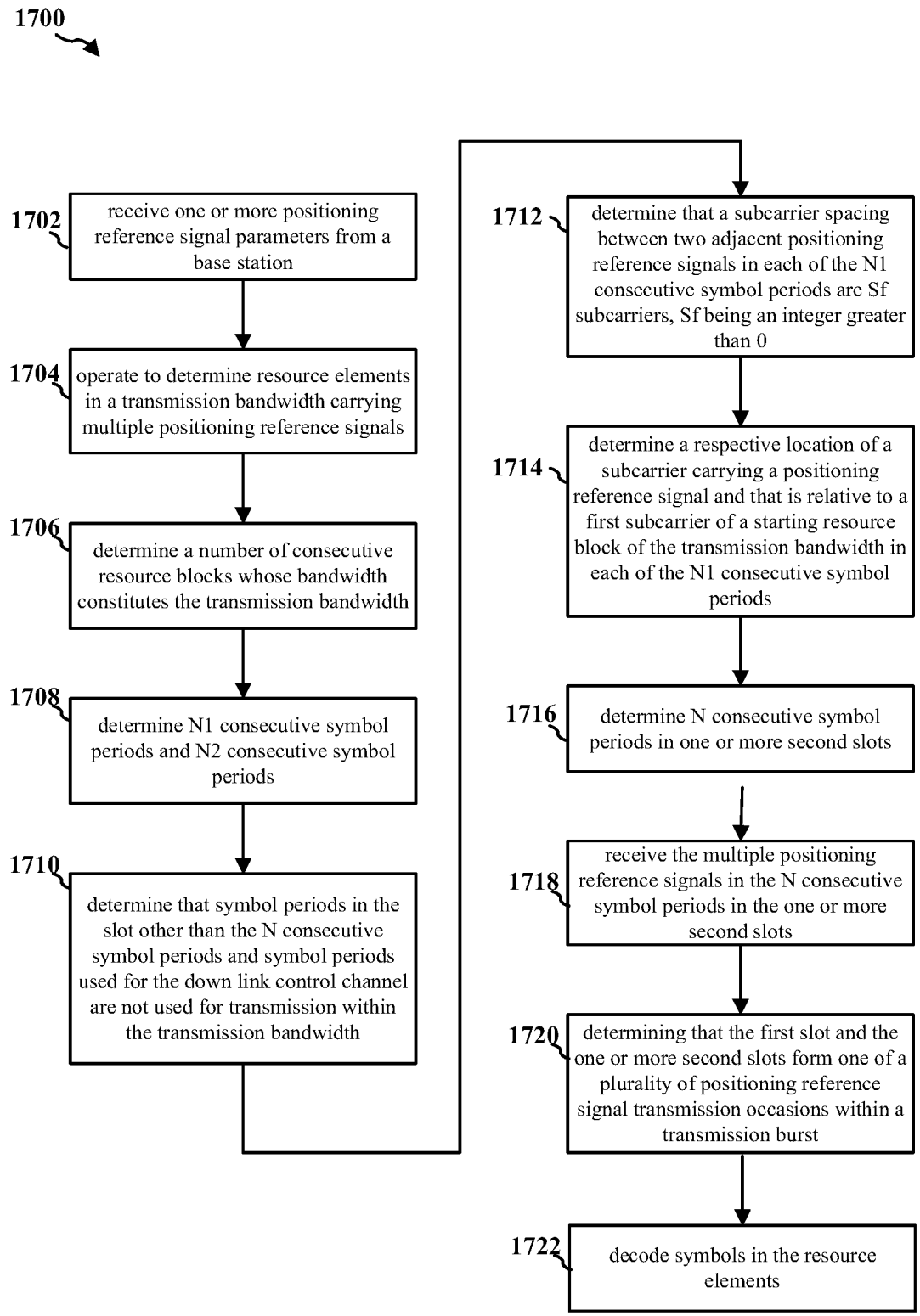
FIG. 17 is a flow chart of a method (process) of detecting multiple positioning reference signals.

FIG. 17 is a flow chart 1700 of a method (process) of detecting multiple positioning reference signals. The method may be performed by a UE (e.g., the UE 704, the apparatus 1802, and the apparatus 1802'). At operation 1702, the UE receives one or more positioning reference signal parameters from a base station. At operation 1704, the UE operates to determine resource elements in a transmission bandwidth carrying multiple positioning reference signals based on the positioning reference signal parameters.

In certain configurations, the transmission bandwidth is a portion of a bandwidth of a carrier used for communication between the UE and the base station. In certain configurations, the one or more positioning reference signal parameters are configured by a higher layer. In certain configurations, the one or more positioning reference signal parameters specify a starting resource block of the transmission bandwidth and the transmission bandwidth, At operation 1706, the UE determines a number of consecutive resource blocks whose bandwidth constitutes the transmission bandwidth based on the one or more positioning reference signal parameters. In certain configurations, at operation 1708, the UE determines N1 consecutive symbol periods of N consecutive symbol periods during which a first part of multiple positioning reference signals are transmitted and N2 consecutive symbol periods during which a second part of the multiple positioning reference signals are transmitted, N1 and N2 each being an integer, a sum of N1 and N2 being equal to N. In certain configurations, the resource elements are in the N consecutive symbol periods with a same starting resource block and within the transmission bandwidth. In certain configurations, the first part of the multiple positioning reference signals forms a first pattern and the second part of the multiple positioning reference signals form a second pattern.

In certain configurations, the UE receives a down link control channel in symbol periods of the slot other than the N consecutive symbol periods. At operation 1710, the UE determines that symbol periods in the slot other than the N consecutive symbol periods and symbol periods used for the down link control channel are not used for transmission within the transmission bandwidth.

In certain configurations, the UE receives, within a slot, positioning reference signals in each of a plurality of N consecutive symbol periods transmitted using a respective different downlink transmission filter.

In certain configurations, at operation 1712, the UE determines that a subcarrier spacing between two adjacent positioning reference signals in each of the N1 consecutive symbol periods are $S_f$ subcarriers, $S_f$ being an integer greater than 0. At operation 1714, the UE determines a respective location of a subcarrier carrying a positioning reference signal and that is relative to a first subcarrier of a starting resource block of the transmission bandwidth in each of the N1 consecutive symbol periods.

At operation 1716, the UE determines N consecutive symbol periods in one or more second slots during which the multiple positioning reference signals are repeatedly transmitted, the one or more second slots being subsequent and consecutive to the first slot. At operation 1718, the UE receives the multiple positioning reference signals in the N consecutive symbol periods in the one or more second slots. At operation 1720, the UE determines that the first slot and the one or more second slots form one of a plurality of positioning reference signal transmission occasions within a transmission burst. At operation 1722, the UE decodes symbols in the resource elements carrying the positioning reference signals.

In certain configurations, the UE receives an indication indicating whether the multiple positioning reference signals are transmitted from one antenna port or two antenna ports at the base station. In certain configurations, the decoding the symbols is based on whether the multiple positioning reference signals are transmitted from one antenna port or two antenna ports.

In certain configurations, resource elements in the N consecutive symbol periods are mapped to consecutive physical sources in time domain within a slot. In certain configurations, resource elements in the N consecutive symbol periods are mapped to non-consecutive physical sources in time domain within a slot.

In certain configurations, in the N1 consecutive symbol periods, each positioning reference signal of the first part of the multiple positioning reference signals occupies a subcarrier different from subcarriers occupied by other multiple positioning reference signals of the first part of the multiple positioning reference signals. The positioning reference signals in each symbol period of the N1 consecutive symbol periods are evenly distributed on subcarriers of the transmission bandwidth.

In certain configurations, the N1 consecutive symbol periods correspond to respective N1 segments of the transmission bandwidth that do not overlap with each other. In each of the N1 consecutive symbol periods, a portion of the first part of the multiple positioning reference signals is evenly distributed on subcarriers of a respective segment of the transmission bandwidth corresponding to the each symbol period. In certain configurations, subcarriers occupied by the first part of the multiple positioning reference signals in each of the N1 consecutive symbol periods are the same and are evenly distributed in a segment of the transmission bandwidth. In certain configurations, subcarriers occupied by the second part of the multiple positioning reference signals transmitted in the N2 consecutive symbol periods are a subset of subcarriers occupied by the first part of the multiple positioning reference signals transmitted in the N1 consecutive symbol periods. The positioning reference signals in each symbol period of the N2 consecutive symbol periods are evenly distributed on subcarriers of the transmission bandwidth.

In certain configurations, subcarriers occupied by the second part of the multiple positioning reference signals transmitted in the N2 consecutive symbol periods at least partially overlap with subcarriers occupied by the first part of the multiple positioning reference signals transmitted in the N1 consecutive symbol periods. A portion of the second part of the multiple positioning reference signals is evenly distributed on subcarriers of the transmission bandwidth in each of the N2 consecutive symbol periods. In certain configurations, a density of the first part of the multiple positioning reference signals in the N1 consecutive symbol periods is the same as a density of the second part of the multiple positioning reference signals in the N2 consecutive symbol periods. In certain configurations, a density of the first part of the multiple positioning reference signals in the N1 consecutive symbol periods is different from a density of the second part of the multiple positioning reference signals in the N2 consecutive symbol periods.

In certain configurations, a sum of N1 and N2 is less than or equal to 14 and is greater than or equal to 2. In certain configurations, N1 is greater than or equal to 2, N1 is less than or equal to 12. In certain configurations, to determine the N symbol periods, the UE determines an index of a first symbol period of the N consecutive symbol periods in a first slot of a transmission burst. In certain configurations, the first symbol period is selected from a set of predetermined symbol periods within a slot. In certain configurations, the plurality of positioning reference signal transmission occasions are periodic. In certain configurations, the plurality of positioning reference signal transmission occasions are aperiodic. In certain configurations, the plurality of positioning reference signal transmission occasions are semi-persistent.

In certain configurations, the multiple positioning reference signals in the first slot of a transmission burst and the multiple positioning reference signals in the one or more second slots in the same transmission burst are transmitted using different downlink transmission filers. In certain configurations, the multiple positioning reference signals in the first slot of a transmission burst and the multiple positioning reference signals in the one or more second slots in the same transmission burst are transmitted using a same downlink transmission filer.

In certain configurations, N1 is greater than or equal to 1 and is less than or equal to $S_f$, or N1 is further greater than or equal to $S_f/2$ and $S_f$ is 2, 4, 6, 8, or 12, or N1 is further an integer greater than or equal to $S_f/2$ and $S_f$ is 1 or 3.

In certain configurations, the UE determines a subcarrier shift based on the positioning reference signal parameters. The UE determines consecutive symbol period indices of the N1 symbol periods within a slot. The UE determines a location of a subcarrier carrying a positioning reference signal that is relative to a first subcarrier of a starting resource block of the transmission bandwidth in a particular symbol period of the N1 symbol periods as $$S_f * m + (l + V_{shift}) \bmod S_f, \text{ or}$$

$$S_f * m + (-l + V_{shift}) \bmod S_f, \text{ or}$$

$$S_f * m + \left(l * \frac{S_f}{2} - \lfloor l/2 \rfloor + V_{shift}\right) \bmod S_f, \text{ or}$$

$$S_f * m + \left(-l * \frac{S_f}{2} + \lfloor l/2 \rfloor + V_{shift}\right) \bmod S_f, \text{ or}$$

$$S_f * m + \left(-l * \frac{S_f}{2} - \lfloor l/2 \rfloor + V_{shift}\right) \bmod S_f, \text{ or}$$

$$S_f * m + \left(l * \frac{S_f}{2} - \lfloor l/2 \rfloor + V_{shift}\right) \bmod S_f, \text{ or}$$

$$S_f * m + \left(l * \frac{S_f}{2} + \left(\left(2 * \lfloor \frac{l}{2} \rfloor\right) \bmod \left(\frac{S_f}{2}\right)\right) + \lfloor \frac{l}{4} \rfloor + V_{shift}\right) \bmod S_f, \text{ or}$$

$$S_f * m + \left(\lfloor l / \left(\frac{S_f}{2}\right) \rfloor + 2 * \left(l \bmod \left(\frac{S_f}{2}\right)\right) + V_{shift}\right) \bmod S_f, \text{ or}$$

$$S_f * m + \left(-\lfloor l / \left(\frac{S_f}{2}\right) \rfloor - 2 * \left(l \bmod \left(\frac{S_f}{2}\right)\right) + V_{shift}\right) \bmod S_f, \text{ or}$$

$$S_f * m + \left(\lfloor l / \left(\frac{S_f}{2}\right) \rfloor - 2 * \left(l \bmod \left(\frac{S_f}{2}\right)\right) + V_{shift}\right) \bmod S_f, \text{ or}$$

$$S_f * m + \left(-\lfloor l / \left(\frac{S_f}{2}\right) \rfloor + 2 * \left(l \bmod \left(\frac{S_f}{2}\right)\right) + V_{shift}\right) \bmod S_f.$$

m is an integer between 0 and $((12/S_f)*B-1)$ inclusive. B is a number of resource blocks within the transmission bandwidth. l is a symbol period index of the particular symbol period in the N1 consecutive symbol periods and starts from 0. V shift is the subcarrier shift as specified by the positioning reference signal parameters.

In certain configurations, the UE determines first consecutive symbol period indices of the N1 symbol periods. The UE determines second consecutive symbol period indices of the N2 symbol periods. The UE determines that locations of subcarriers carrying positioning reference signals that are relative to a first subcarrier of a starting resource block of the transmission bandwidth in a particular symbol period of the N2 symbol periods are the same as locations of subcarriers carrying positioning reference signals in a particular symbol period of the N1 consecutive symbol periods having a relative symbol period index of (q mod N1). q is a relative symbol period index of the particular symbol period in the N2 consecutive symbol periods and starts from 0.

Figure 18:
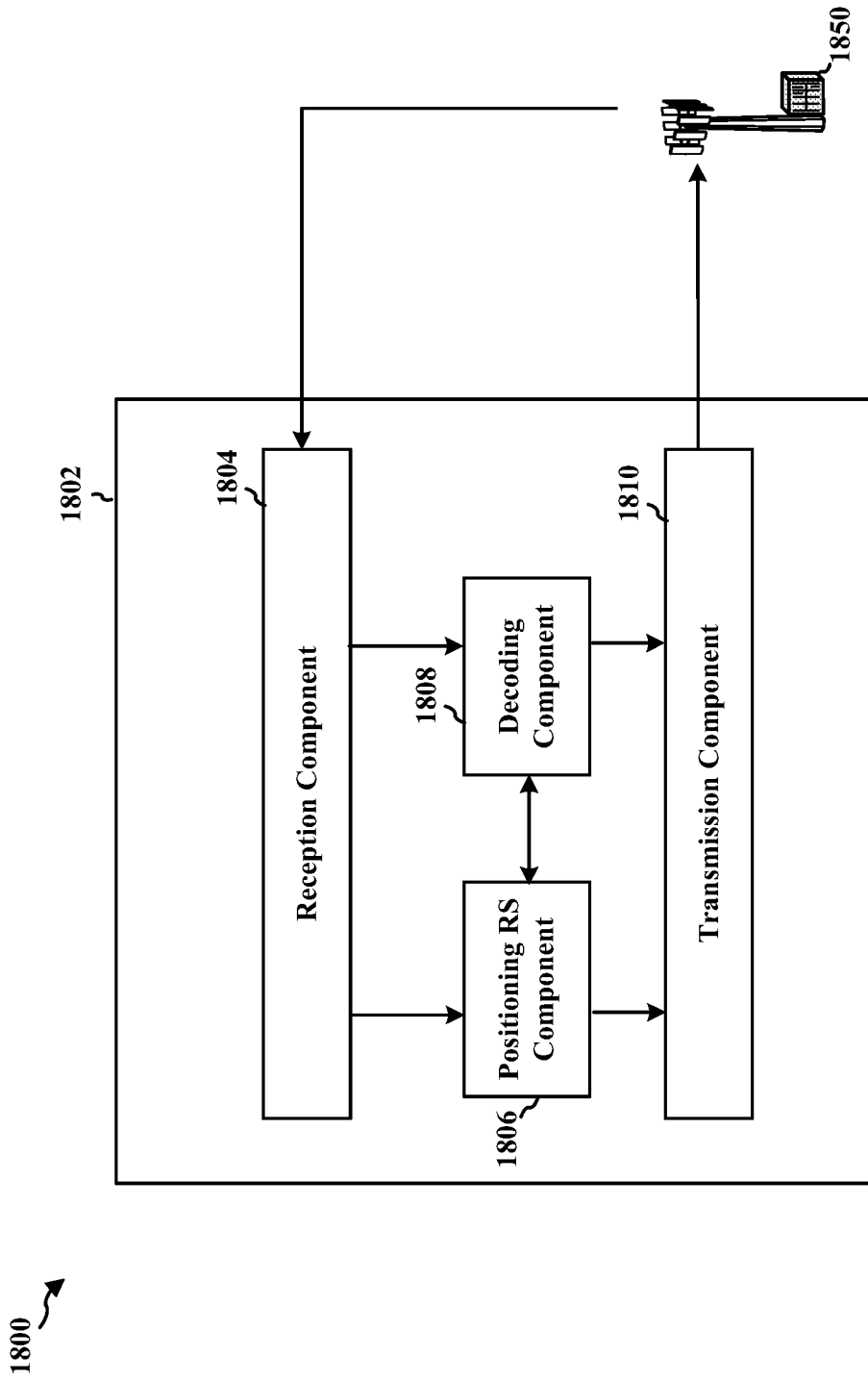
FIG. 18 is a conceptual data flow diagram illustrating the data flow between different components/means in an exemplary apparatus.

FIG. 18 is a conceptual data flow diagram 1800 illustrating the data flow between different components/means in an exemplary apparatus 1802. The apparatus 1802 may be a UE. The apparatus 1802 includes a reception component 1804, a positioning reference signal component 1806, a decoding component 1808, and a transmission component 1810.

The positioning reference signal component 1806 receives one or more positioning reference signal parameters from a base station. The positioning reference signal component 1806 operates to determine resource elements in a transmission bandwidth carrying multiple positioning reference signals based on the positioning reference signal parameters.

In certain configurations, the transmission bandwidth is a portion of a bandwidth of a carrier used for communication between the positioning reference signal component 1806 and the base station. In certain configurations, the one or more positioning reference signal parameters are configured by a higher layer. In certain configurations, the one or more positioning reference signal parameters specify a starting resource block of the transmission bandwidth and the transmission bandwidth. The positioning reference signal component 1806 determines a number of consecutive resource blocks whose bandwidth constitutes the transmission bandwidth based on the one or more positioning reference signal parameters. In certain configurations, the positioning reference signal component 1806 determines N1 consecutive symbol periods of N consecutive symbol periods during which a first part of multiple positioning reference signals are transmitted and N2 consecutive symbol periods during which a second part of the multiple positioning reference signals are transmitted, N1 and N2 each being an integer, a sum of N1 and N2 being equal to N. In certain configurations, the resource elements are in the N consecutive symbol periods with a same starting resource block and within the transmission bandwidth. In certain configurations, the first part of the multiple positioning reference signals forms a first pattern and the second part of the multiple positioning reference signals form a second pattern.

In certain configurations, the reception component 1804 receives a down link control channel in symbol periods of the slot other than the N consecutive symbol periods. The positioning reference signal component 1806 determines that symbol periods in the slot other than the N consecutive symbol periods and symbol periods used for the down link control channel are not used for transmission within the transmission bandwidth.

In certain configurations, the positioning reference signal component 1806 receives, within a slot, positioning reference signals in each of a plurality of N consecutive symbol periods transmitted using a respective different downlink transmission filter.

In certain configurations, the positioning reference signal component 1806 determines that a subcarrier spacing between two adjacent positioning reference signals in each of the N1 consecutive symbol periods are $S_f$ subcarriers, $S_f$ being an integer greater than 0. The positioning reference signal component 1806 determines a respective location of a subcarrier carrying a positioning reference signal and that is relative to a first subcarrier of a starting resource block of the transmission bandwidth in each of the N1 consecutive symbol periods.

The positioning reference signal component 1806 determines N consecutive symbol periods in one or more second slots during which the multiple positioning reference signals are repeatedly transmitted, the one or more second slots being subsequent and consecutive to the first slot. The positioning reference signal component 1806 receives the multiple positioning reference signals in the N consecutive symbol periods in the one or more second slots. The positioning reference signal component 1806 determines that the first slot and the one or more second slots form one of a plurality of positioning reference signal transmission occasions within a transmission burst. The decoding component 1808 decodes symbols in the resource elements carrying the positioning reference signals.

In certain configurations, the positioning reference signal component 1806 receives an indication indicating whether the multiple positioning reference signals are transmitted from one antenna port or two antenna ports at the base station. In certain configurations, the decoding the symbols is based on whether the multiple positioning reference signals are transmitted from one antenna port or two antenna ports.

In certain configurations, resource elements in the N consecutive symbol periods are mapped to consecutive physical sources in time domain within a slot. In certain configurations, resource elements in the N consecutive symbol periods are mapped to non-consecutive physical sources in time domain within a slot.

In certain configurations, in the N1 consecutive symbol periods, each positioning reference signal of the first part of the multiple positioning reference signals occupies a subcarrier different from subcarriers occupied by other multiple positioning reference signals of the first part of the multiple positioning reference signals. The positioning reference signals in each symbol period of the N1 consecutive symbol periods are evenly distributed on subcarriers of the transmission bandwidth.

In certain configurations, the N1 consecutive symbol periods correspond to respective N1 segments of the transmission bandwidth that do not overlap with each other. In each of the N1 consecutive symbol periods, a portion of the first part of the multiple positioning reference signals is evenly distributed on subcarriers of a respective segment of the transmission bandwidth corresponding to the each symbol period. In certain configurations, subcarriers occupied by the first part of the multiple positioning reference signals in each of the N1 consecutive symbol periods are the same and are evenly distributed in a segment of the transmission bandwidth. In certain configurations, subcarriers occupied by the second part of the multiple positioning reference signals transmitted in the N2 consecutive symbol periods are a subset of subcarriers occupied by the first part of the multiple positioning reference signals transmitted in the N1 consecutive symbol periods. The positioning reference signals in each symbol period of the N2 consecutive symbol periods are evenly distributed on subcarriers of the transmission bandwidth.

In certain configurations, subcarriers occupied by the second part of the multiple positioning reference signals transmitted in the N2 consecutive symbol periods at least partially overlap with subcarriers occupied by the first part of the multiple positioning reference signals transmitted in the N1 consecutive symbol periods. A portion of the second part of the multiple positioning reference signals is evenly distributed on subcarriers of the transmission bandwidth in each of the N2 consecutive symbol periods. In certain configurations, a density of the first part of the multiple positioning reference signals in the N1 consecutive symbol periods is the same as a density of the second part of the multiple positioning reference signals in the N2 consecutive symbol periods. In certain configurations, a density of the first part of the multiple positioning reference signals in the N1 consecutive symbol periods is different from a density of the second part of the multiple positioning reference signals in the N2 consecutive symbol periods.

In certain configurations, a sum of N1 and N2 is less than or equal to 14 and is greater than or equal to 2. In certain configurations, N1 is greater than or equal to 2, N1 is less than or equal to 12. In certain configurations, to determine the N symbol periods, the positioning reference signal component 1806 determines an index of a first symbol period of the N consecutive symbol periods in a first slot of a transmission burst. In certain configurations, the first symbol period is selected from a set of predetermined symbol periods within a slot. In certain configurations, the plurality of positioning reference signal transmission occasions are periodic. In certain configurations, the plurality of positioning reference signal transmission occasions are aperiodic. In certain configurations, the plurality of positioning reference signal transmission occasions are semi-persistent.

In certain configurations, the multiple positioning reference signals in the first slot of a transmission burst and the multiple positioning reference signals in the one or more second slots in the same transmission burst are transmitted using different downlink transmission filers. In certain configurations, the multiple positioning reference signals in the first slot of a transmission burst and the multiple positioning reference signals in the one or more second slots in the same transmission burst are transmitted using a same downlink transmission filer.

In certain configurations, N1 is greater than or equal to 1 and is less than or equal to $S_f$, or N1 is further greater than or equal to $S_f/2$ and $S_f$ is 2, 4, 6, 8, or 12, or N1 is further an integer greater than or equal to $S_f/2$ and $S_f$ is 1 or 3.

In certain configurations, the positioning reference signal component 1806 determines a subcarrier shift based on the positioning reference signal parameters. The positioning reference signal component 1806 determines consecutive symbol period indices of the N1 symbol periods within a slot. The positioning reference signal component 1806 determines a location of a subcarrier carrying a positioning reference signal that is relative to a first subcarrier of a starting resource block of the transmission bandwidth in a particular symbol period of the N1 symbol periods as $$S_f * m + (l + V_{shift}) \bmod S_f, \text{ or}$$

$$S_f * m + (-l + V_{shift}) \bmod S_f, \text{ or}$$

$$S_f * m + \left(l * \frac{S_f}{2} + \lfloor l/2 \rfloor + V_{shift}\right) \bmod S_f, \text{ or}$$

$$S_f * m + \left(-l * \frac{S_f}{2} + \lfloor l/2 \rfloor + V_{shift}\right) \bmod S_f, \text{ or}$$

$$S_f * m + \left(-l * \frac{S_f}{2} - \lfloor l/2 \rfloor + V_{shift}\right) \bmod S_f, \text{ or}$$

$$S_f * m + \left(l * \frac{S_f}{2} - \lfloor l/2 \rfloor + V_{shift}\right) \bmod S_f, \text{ or}$$

$$S_f * m + \left(l * \frac{S_f}{2} + \left(\left(2 * \left\lfloor \frac{l}{2} \right\rfloor\right) \bmod \left(\frac{S_f}{2}\right)\right) + \left\lfloor \frac{l}{4} \right\rfloor + V_{shift}\right) \bmod S_f, \text{ or}$$

$$S_f * m + \left(\left\lfloor l/\left(\frac{S_f}{2}\right)\right\rfloor + 2 * \left(l \bmod \frac{S_f}{2}\right) + V_{shift}\right) \bmod S_f, \text{ or}$$

$$S_f * m + \left(-\left\lfloor l/\left(\frac{S_f}{2}\right)\right\rfloor - 2 * \left(l \bmod \frac{S_f}{2}\right) + V_{shift}\right) \bmod S_f, \text{ or}$$

$$S_f * m + \left(\left\lfloor l/\left(\frac{S_f}{2}\right)\right\rfloor - 2 * \left(l \bmod \frac{S_f}{2}\right) + V_{shift}\right) \bmod S_f, \text{ or}$$

-continued $$S_f * m + \left( - \left\lfloor \frac{l}{\left(\frac{S_f}{2}\right)} \right\rfloor + 2 * \left( l \bmod\left(\frac{S_f}{2}\right) \right) + V_{shift} \right) \bmod S_f.$$

m is an integer between 0 and $((12/S_f)*B-1)$ inclusive, B is a number of resource blocks within the transmission bandwidth. l is a symbol period index of the particular symbol period in the N1 consecutive symbol periods and starts from 0. $V_{shift}$ is the subcarrier shift as specified by the positioning reference signal parameters.

In certain configurations, the positioning reference signal component 1806 determines first consecutive symbol period indices of the N1 symbol periods. The positioning reference signal component 1806 determines second consecutive symbol period indices of the N2 symbol periods. The positioning reference signal component 1806 determines that locations of subcarriers carrying positioning reference signals that are relative to a first subcarrier of a starting resource block of the transmission bandwidth in a particular symbol period of the N2 symbol periods are the same as locations of subcarriers carrying positioning reference signals in a particular symbol period of the N1 consecutive symbol periods having a relative symbol period index of (q mod N1). q is a relative symbol period index of the particular symbol period in the N2 consecutive symbol periods and starts from 0.

Figure 19:
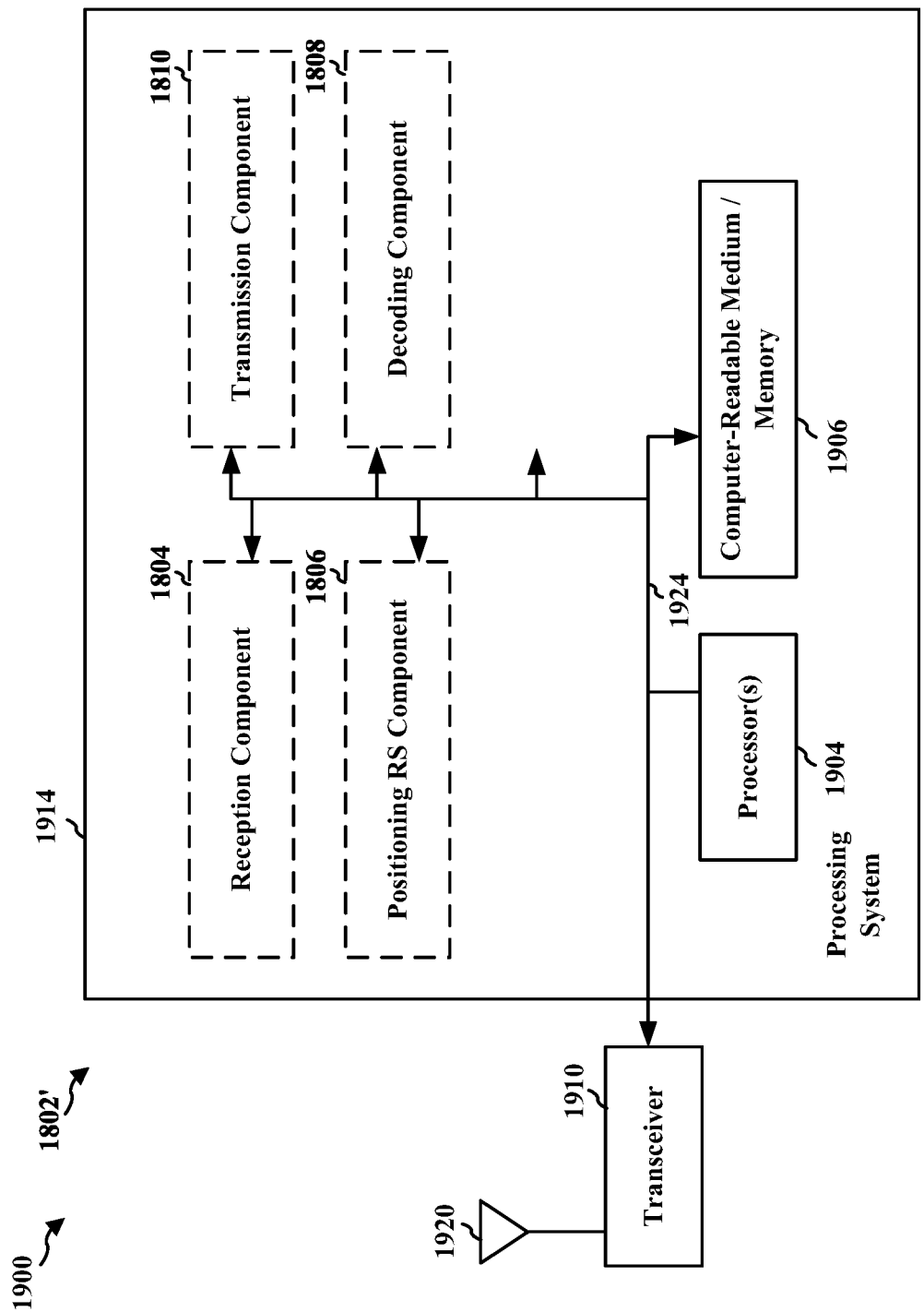
FIG. 19 is a diagram illustrating an example of a hardware implementation for an apparatus employing a processing system.

FIG. 19 is a diagram 1900 illustrating an example of a hardware implementation for an apparatus 1802' employing a processing system 1914. The apparatus 1802' may be a UE. The processing system 1914 may be implemented with a bus architecture, represented generally by a bus 1924. The bus 1924 may include any number of interconnecting buses and bridges depending on the specific application of the processing system 1914 and the overall design constraints. The bus 1924 links together various circuits including one or more processors and/or hardware components, represented by one or more processors 1904, the reception component 1804, the positioning reference signal component 1806, the decoding component 1808, the transmission component 1810, and a computer-readable medium/memory 1906. The bus 1924 may also link various other circuits such as timing sources, peripherals, voltage regulators, and power management circuits, etc.

The processing system 1914 may be coupled to a transceiver 1910, which may be one or more of the transceivers 254. The transceiver 1910 is coupled to one or more antennas 1920, which may be the communication antennas 252.

The transceiver 1910 provides a means for communicating with various other apparatus over a transmission medium. The transceiver 1910 receives a signal from the one or more antennas 1920, extracts information from the received signal, and provides the extracted information to the processing system 1914, specifically the reception component 1804. In addition, the transceiver 1910 receives information from the processing system 1914, specifically the transmission component 1810, and based on the received information, generates a signal to be applied to the one or more antennas 1920.

The processing system 1914 includes one or more processors 1904 coupled to a computer-readable medium/memory 1906. The one or more processors 1904 are responsible for general processing, including the execution of software stored on the computer-readable medium/memory 1906. The software, when executed by the one or more processors 1904, causes the processing system 1914 to perform the various functions described supra for any particular apparatus. The computer-readable medium/memory 1906 may also be used for storing data that is manipulated by the one or more processors 1904 when executing software. The processing system 1914 further includes at least one of the reception component 1804, the positioning reference signal component 1806, the decoding component 1808, and the transmission component 1810. The components may be software components running in the one or more processors 1904, resident/stored in the computer readable medium/memory 1906, one or more hardware components coupled to the one or more processors 1904, or some combination thereof. The processing system 1914 may be a component of the UE 250 and may include the memory 260 and/or at least one of the TX processor 268, the RX processor 256, and the communication processor 259.

In one configuration, the apparatus 1802/apparatus 1802' for wireless communication includes means for performing each of the operations of FIG. 17. The aforementioned means may be one or more of the aforementioned components of the apparatus 1802 and/or the processing system 1914 of the apparatus 1802' configured to perform the functions recited by the aforementioned means.

As described supra, the processing system 1914 may include the TX Processor 268, the RX Processor 256, and the communication processor 259. As such, in one configuration, the aforementioned means may be the TX Processor 268, the RX Processor 256, and the communication processor 259 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a user equipment (UE), comprising:
receiving one or more positioning reference signal parameters from a base station; and
determining, in a transmission bandwidth and in accordance with the one or more positioning reference signal parameters, a first part of multiple positioning reference signals transmitted on N1 consecutive symbol periods in a slot and a second part of the multiple positioning reference signals transmitted on N2 consecutive symbol periods in the slot, N1 and N2 each being an integer, wherein a location of a subcarrier carrying a positioning reference signal in a particular symbol period of the N1 symbol periods is determined as:

$$S_f * m + \left(l * \frac{S_f}{2} + \lfloor l/2 \rfloor + V_{shift}\right) \bmod S_f,$$

wherein a subcarrier spacing between two adjacent positioning reference signals in each of the N1 consecutive symbol periods are $S_f$ subcarriers, $S_f$ being an integer greater than 0, m is an integer equal to or greater than 0, l is a symbol period index of the particular symbol period in the N1 consecutive symbol periods and starts from 0, $V_{shift}$ is a subcarrier shift.

2. The method of claim 1, further comprising:
receiving an indication indicating whether the multiple positioning reference signals are transmitted from one antenna port or two antenna ports at the base station; and
performing decoding based on whether the multiple positioning reference signals are transmitted from one antenna port or two antenna ports.

3. The method of claim 1, wherein the one or more positioning reference signal parameters are configured by a higher layer, wherein the one or more positioning reference signal parameters specify a starting resource block of the transmission bandwidth and the transmission bandwidth, the method further comprising:
determining a number of consecutive resource blocks whose bandwidth constitutes the transmission bandwidth based on the one or more positioning reference signal parameters.

4. The method of claim 1, wherein the multiple positioning reference signals are mapped to resource elements with a same starting resource block and within the transmission bandwidth in N consecutive symbol periods in the slot.

5. The method of claim 4, wherein in the N1 consecutive symbol periods, each positioning reference signal of the first part of the multiple positioning reference signals occupies a subcarrier different from subcarriers occupied by other multiple positioning reference signals of the first part of the multiple positioning reference signals.

6. The method of claim 5, wherein positioning reference signals in each symbol period of the N1 consecutive symbol periods are evenly distributed on subcarriers of the transmission bandwidth.

7. The method of claim 5, wherein the N1 consecutive symbol periods correspond to respective N1 segments of the transmission bandwidth that do not overlap with each other, wherein in each of the N1 consecutive symbol periods a portion of the first part of the multiple positioning reference signals is evenly distributed on subcarriers of a respective segment of the transmission bandwidth corresponding to the each symbol period.

8. The method of claim 4, wherein subcarriers occupied by the second part of the multiple positioning reference signals transmitted in the N2 consecutive symbol periods are a subset of subcarriers occupied by the first part of the multiple positioning reference signals transmitted in the N1 consecutive symbol periods, wherein positioning reference signals in each symbol period of the N2 consecutive symbol periods are evenly distributed on subcarriers of the transmission bandwidth.

9. The method of claim 4, wherein subcarriers occupied by the second part of the multiple positioning reference signals transmitted in the N2 consecutive symbol periods at least partially overlap with subcarriers occupied by the first part of the multiple positioning reference signals transmitted in the N1 consecutive symbol periods, wherein a portion of the second part of the multiple positioning reference signals is evenly distributed on subcarriers of the transmission bandwidth in each of the N2 consecutive symbol periods.

10. The method of claim 4, further comprising:
receiving a down link control channel in symbol periods of the slot other than the N consecutive symbol periods; or
determining that symbol periods in the slot other than the N consecutive symbol periods and symbol periods used for the down link control channel are not used for transmission within the transmission bandwidth.

11. The method of claim 4, wherein (a) a sum of N1 and N2 is less than or equal to 14 and is greater than or equal to 2, (b) N1 is greater than or equal to 2, or (c) N1 is less than or equal to 12.

12. The method of claim 4, further comprising:
determining an index of a first symbol period, from a set of predetermined symbol periods within the slot, of the N consecutive symbol periods in a transmission burst.

13. The method of claim 4, further comprising:
determining N consecutive symbol periods in one or more second slots during which the multiple positioning reference signals are repeatedly transmitted, the one or more second slots being subsequent and consecutive to the slot;
receiving the multiple positioning reference signals in the N consecutive symbol periods in the one or more second slots; and
determining that the slot and the one or more second slots form one of a plurality of positioning reference signal transmission occasions within a transmission burst.

14. The method of claim 4, further comprising:
determining the subcarrier spacing; and
determining a respective location of a subcarrier carrying a positioning reference signal and that is relative to a first subcarrier of the starting resource block of the transmission bandwidth in each of the N1 consecutive symbol periods, wherein N1 is greater than or equal to 1 and is less than or equal to $S_f$, or wherein N1 is further greater than or equal to $S_f/2$ and $S_f$ is 2, 4, 6, 8, or 12, or wherein N1 is further an integer greater than or equal to $S_f/2$ and $S_f$ is 1 or 3.

15. The method of claim 14, further comprising:
determining the subcarrier shift based on the positioning reference signal parameters;
determining consecutive symbol period indices of the N1 symbol periods within the slot; and
determining the location of a subcarrier carrying a positioning reference signal that is relative to the first subcarrier of the starting resource block of the transmission bandwidth in the particular symbol period of the N1 symbol periods.

16. The method of claim 14, further comprising:
determining first consecutive symbol period indices of the N1 symbol periods;
determining second consecutive symbol period indices of the N2 symbol periods;
determining that locations of subcarriers carrying positioning reference signals that are relative to the first subcarrier of the starting resource block of the transmission bandwidth in a particular symbol period of the N2 symbol periods are the same as locations of subcarriers carrying positioning reference signals in the particular symbol period of the N1 consecutive symbol periods having a relative symbol period index of $$q \bmod N_1$$

wherein q is a relative symbol period index of the particular symbol period in the N2 consecutive symbol periods and starts from 0.

17. An apparatus for wireless communication, the apparatus being a user equipment (UE), comprising:
a memory; and
at least one processor coupled to the memory and configured to:
receive one or more positioning reference signal parameters from a base station;
determine, in a transmission bandwidth and in accordance with the one or more positioning reference signal parameters, a first part of multiple positioning reference signals transmitted on N1 consecutive symbol periods in a slot and a second part of the multiple positioning reference signals transmitted on N2 consecutive symbol periods in the slot, N1 and N2 each being an integer, wherein a location of a subcarrier carrying a positioning reference signal in a particular symbol period of the N1 symbol periods is determined as:

$$S_f * m + \left(l * \frac{S_f}{2} + \lfloor l/2 \rfloor + V_{shift}\right) \bmod S_f,$$

wherein a subcarrier spacing between two adjacent positioning reference signals in each of the N1 consecutive symbol periods are $S_f$ subcarriers, $S_f$ being an integer greater than 0, m is an integer equal to or greater than 0, l is a symbol period index of the particular symbol period in the N1 consecutive symbol periods and starts from 0, $V_{shift}$ is a subcarrier shift.

* * * * *